(12) United States Patent
Gniadek et al.

(10) Patent No.: US 11,340,406 B2
(45) Date of Patent: May 24, 2022

(54) SMALL FORM FACTOR FIBER OPTIC CONNECTOR WITH RESILIENT LATCHING MECHANISM FOR SECURING WITHIN A HOOK-LESS RECEPTACLE

(71) Applicant: Senko Advanced Components, Inc., Marlborough, MA (US)

(72) Inventors: Jeffrey Gniadek, Oxford, ME (US); Jimmy Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/853,571

(22) Filed: Apr. 20, 2020

(65) Prior Publication Data

US 2020/0333537 A1   Oct. 22, 2020

Related U.S. Application Data

(60) Provisional application No. 62/836,155, filed on Apr. 19, 2019.

(51) Int. Cl.
*G02B 6/38* (2006.01)

(52) U.S. Cl.
CPC ......... *G02B 6/3826* (2013.01); *G02B 6/3825* (2013.01); *G02B 6/3893* (2013.01)

(58) Field of Classification Search
CPC .............................. G02B 6/3826; G02B 6/3893
(Continued)

(56) References Cited

U.S. PATENT DOCUMENTS

| 681,132 A | 8/1901 | Norton |
|---|---|---|
| 3,721,945 A | 3/1973 | Hulls |

(Continued)

FOREIGN PATENT DOCUMENTS

| CA | 2495693 A1 | 4/2004 |
|---|---|---|
| CN | 2836038 Y | 11/2006 |

(Continued)

OTHER PUBLICATIONS

International Search Report and Written Opinion; Application No. PCT/US2018/042202, dated Dec. 7, 2018, pp. 17.

(Continued)

*Primary Examiner* — Kaveh C Kianni

(57) ABSTRACT

A small form factor optical connector holding two or more LC-type optical ferrules is provided. The optical connector includes an outer body, an inner front body accommodating the two or more LC-type optical ferrules, a pair a resilient latches and corresponding recess for the resilient latch, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes a receptacle hook and a housing with an opening that accommodates the receptacle hook in a flexed position as the optical connector makes connection with the mating receptacle by introducing the receptacle hook into an optical receptacle hook recess.

21 Claims, 26 Drawing Sheets

(58) Field of Classification Search
USPC .......................................................... 385/78
See application file for complete search history.

(56) References Cited

U.S. PATENT DOCUMENTS

| | | | |
|---|---|---|---|
| 4,150,790 A | 4/1979 | Potter | |
| 4,240,695 A | 12/1980 | Evans | |
| 4,327,964 A | 5/1982 | Haesly et al. | |
| 4,478,473 A | 10/1984 | Frear | |
| 4,611,887 A * | 9/1986 | Glover | G02B 6/3831 |
| | | | 385/69 |
| 4,762,388 A | 8/1988 | Tanaka et al. | |
| 4,764,129 A | 8/1988 | Jones et al. | |
| 4,840,451 A | 6/1989 | Sampson et al. | |
| 4,872,736 A | 10/1989 | Myers et al. | |
| 4,979,792 A | 12/1990 | Weber et al. | |
| 5,011,025 A | 4/1991 | Lacey | |
| 5,016,968 A * | 5/1991 | Hammond | G02B 6/3831 |
| | | | 385/78 |
| 5,026,138 A | 6/1991 | Boudreau | |
| 5,031,981 A | 7/1991 | Peterson | |
| 5,041,025 A | 8/1991 | Haitmanek | |
| 5,073,045 A | 12/1991 | Abendschein | |
| D323,143 S | 1/1992 | Ohkura et al. | |
| 5,101,463 A | 3/1992 | Cubukciyan et al. | |
| 5,146,813 A | 9/1992 | Stanfill, Jr. | |
| 5,159,652 A | 10/1992 | Grassin D'Alphonse et al. | |
| 5,212,752 A | 5/1993 | Stephenson et al. | |
| 5,265,181 A | 11/1993 | Chang | |
| 5,289,554 A | 2/1994 | Cubukciyan et al. | |
| 5,315,679 A | 5/1994 | Baldwin et al. | |
| 5,317,663 A | 5/1994 | Beard et al. | |
| 5,321,784 A | 6/1994 | Cubukciyan et al. | |
| 5,335,301 A | 8/1994 | Newman et al. | |
| 5,348,487 A | 9/1994 | Marazzi et al. | |
| 5,418,875 A | 5/1995 | Nakamo et al. | |
| 5,444,806 A | 8/1995 | De Marchi et al. | |
| 5,481,634 A | 1/1996 | Anderson et al. | |
| 5,506,922 A | 4/1996 | Grois et al. | |
| 5,521,997 A | 5/1996 | Revenolt et al. | |
| 5,570,445 A | 10/1996 | Chou et al. | |
| 5,579,425 A * | 11/1996 | Lampert | G02B 6/3879 |
| | | | 385/59 |
| 5,588,079 A | 12/1996 | Tanabe et al. | |
| 5,602,951 A | 2/1997 | Shiota | |
| 5,684,903 A | 11/1997 | Kyomasu et al. | |
| 5,687,268 A | 11/1997 | Stephenson et al. | |
| 5,781,681 A | 7/1998 | Manning | |
| 5,845,036 A | 12/1998 | De Marchi | |
| 5,862,282 A | 1/1999 | Matsuura et al. | |
| 5,879,173 A * | 3/1999 | Poplawski | G02B 6/4284 |
| | | | 439/138 |
| 5,915,987 A | 6/1999 | Reed | |
| 5,930,426 A | 7/1999 | Harting et al. | |
| 5,937,130 A | 8/1999 | Amberg et al. | |
| 5,953,473 A | 9/1999 | Shimotsu et al. | |
| 5,956,444 A | 9/1999 | Duda et al. | |
| 5,971,626 A | 10/1999 | Knodell et al. | |
| 6,041,155 A | 3/2000 | Anderson et al. | |
| 6,049,040 A | 4/2000 | Biles et al. | |
| 6,095,862 A | 8/2000 | Doye et al. | |
| 6,134,370 A | 10/2000 | Childers et al. | |
| 6,178,283 B1 | 1/2001 | Weigel | |
| RE37,080 E | 3/2001 | Stephenson et al. | |
| 6,206,577 B1 | 3/2001 | Hall, III et al. | |
| 6,206,581 B1 | 3/2001 | Driscoll et al. | |
| 6,227,717 B1 | 5/2001 | Ott et al. | |
| 6,238,104 B1 | 5/2001 | Yamakawa et al. | |
| 6,240,228 B1 | 5/2001 | Chen et al. | |
| 6,247,849 B1 | 6/2001 | Liu | |
| 6,250,817 B1 | 6/2001 | Lampert et al. | |
| 6,318,903 B1 | 6/2001 | Lampert et al. | |
| 6,267,606 B1 * | 7/2001 | Poplawski | G02B 6/4246 |
| | | | 439/92 |
| 6,276,840 B1 | 8/2001 | Weiss | |
| 6,364,537 B1 | 4/2002 | Maynard | |
| 6,379,052 B1 | 4/2002 | de Jong | |
| 6,422,759 B1 | 7/2002 | Kevern | |
| 6,450,695 B1 | 9/2002 | Matsumoto | |
| 6,461,054 B1 | 10/2002 | Iwase | |
| 6,471,412 B1 | 10/2002 | Belenkiy et al. | |
| 6,478,472 B1 | 11/2002 | Anderson et al. | |
| 6,485,194 B1 | 11/2002 | Shirakawa | |
| 6,527,450 B1 | 3/2003 | Miyachi et al. | |
| 6,530,696 B1 | 3/2003 | Ueda et al. | |
| 6,572,276 B1 | 3/2003 | Miyachi et al. | |
| 6,551,117 B2 | 4/2003 | Poplawski et al. | |
| 6,565,262 B2 | 5/2003 | Childers et al. | |
| 6,579,014 B2 | 6/2003 | Melton et al. | |
| 6,585,194 B1 | 7/2003 | Brushwood | |
| 6,634,796 B2 | 10/2003 | de Jong et al. | |
| 6,634,801 B1 | 10/2003 | Waldron et al. | |
| 6,648,520 B2 | 11/2003 | McDonald et al. | |
| 6,668,113 B2 | 12/2003 | Togami et al. | |
| 6,682,228 B2 | 1/2004 | Rathnam et al. | |
| 6,685,362 B2 | 2/2004 | Burkholder et al. | |
| 6,695,486 B1 | 2/2004 | Falkenberg | |
| 6,719,927 B2 * | 4/2004 | Sakurai | G02B 6/3885 |
| | | | 264/1.25 |
| 6,811,321 B1 | 11/2004 | Schmalzigaug et al. | |
| 6,817,272 B2 | 11/2004 | Holland | |
| 6,854,894 B1 | 2/2005 | Yunker et al. | |
| 6,869,227 B2 | 3/2005 | Del Grosso et al. | |
| 6,872,039 B2 | 3/2005 | Baus et al. | |
| 6,935,789 B2 | 8/2005 | Gross, III et al. | |
| 7,036,993 B2 | 5/2006 | Luther et al. | |
| 7,052,186 B1 | 5/2006 | Bates | |
| 7,077,576 B2 | 7/2006 | Luther et al. | |
| 7,090,407 B2 | 8/2006 | Melton et al. | |
| 7,091,421 B2 | 8/2006 | Kukita et al. | |
| 7,111,990 B2 | 9/2006 | Melton et al. | |
| 7,113,679 B2 | 9/2006 | Melton et al. | |
| D533,504 S | 12/2006 | Lee | |
| D534,124 S | 12/2006 | Taguchi | |
| 7,150,567 B1 | 12/2006 | Luther et al. | |
| 7,153,041 B2 | 12/2006 | Mine et al. | |
| 7,198,409 B2 | 4/2007 | Smith et al. | |
| 7,207,724 B2 | 4/2007 | Gurreri | |
| D543,146 S | 5/2007 | Chen et al. | |
| 7,258,493 B2 | 8/2007 | Milette | |
| 7,264,402 B2 | 9/2007 | Theuerkorn et al. | |
| 7,281,859 B2 | 10/2007 | Mudd et al. | |
| D558,675 S | 1/2008 | Chien et al. | |
| 7,315,682 B1 | 1/2008 | En Lin et al. | |
| 7,325,976 B2 | 2/2008 | Gurreri et al. | |
| 7,325,980 B2 | 2/2008 | Pepe | |
| 7,329,137 B2 | 2/2008 | Martin et al. | |
| 7,331,718 B2 | 2/2008 | Yazaki et al. | |
| 7,354,291 B2 | 4/2008 | Caveney et al. | |
| 7,371,082 B2 | 5/2008 | Zimmel et al. | |
| 7,387,447 B2 | 6/2008 | Mudd et al. | |
| 7,390,203 B2 | 6/2008 | Murano et al. | |
| D572,661 S | 7/2008 | En Lin et al. | |
| 7,431,604 B2 | 10/2008 | Waters et al. | |
| 7,463,803 B2 | 12/2008 | Cody et al. | |
| 7,465,180 B2 | 12/2008 | Kusuda et al. | |
| 7,473,124 B1 | 1/2009 | Briant et al. | |
| 7,510,335 B1 | 3/2009 | Su et al. | |
| 7,513,695 B1 | 4/2009 | Lin et al. | |
| 7,534,128 B2 | 5/2009 | Caveney et al. | |
| 7,540,666 B2 | 6/2009 | Luther et al. | |
| 7,561,775 B2 | 7/2009 | Lin et al. | |
| 7,588,373 B1 | 9/2009 | Sato et al. | |
| 7,591,595 B2 | 9/2009 | Lu et al. | |
| 7,594,766 B1 | 9/2009 | Sasser et al. | |
| 7,641,398 B2 | 1/2010 | O'Riorden et al. | |
| 7,695,199 B2 | 4/2010 | Teo et al. | |
| 7,699,533 B2 | 4/2010 | Milette | |
| 7,712,970 B1 | 5/2010 | Lee | |
| 7,717,625 B2 | 5/2010 | Margolin et al. | |
| 7,824,113 B2 | 11/2010 | Wong et al. | |
| 7,837,395 B2 | 11/2010 | Lin et al. | |
| D641,708 S | 7/2011 | Yamauchi | |
| 8,083,450 B1 | 12/2011 | Smith et al. | |

(56) References Cited

U.S. PATENT DOCUMENTS

| | | |
|---|---|---|
| 8,152,385 B2 | 4/2012 | De Jong et al. |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,414,196 B2 | 4/2013 | Lu et al. |
| 8,550,728 B2 | 4/2013 | Lu et al. |
| 8,465,317 B2 | 6/2013 | Gniadek et al. |
| 8,534,928 B2 | 9/2013 | Cooke et al. |
| 8,556,645 B2 | 10/2013 | Crain |
| 8,559,781 B2 | 10/2013 | Childers et al. |
| 8,622,634 B2 | 1/2014 | Arnold et al. |
| 8,636,424 B2 | 1/2014 | Kuffel et al. |
| 8,651,749 B2 | 2/2014 | Dainese Junior et al. |
| 8,676,022 B2 | 3/2014 | Jones |
| 8,678,670 B2 | 3/2014 | Takahashi et al. |
| 8,727,638 B2 | 5/2014 | Lee et al. |
| 8,757,894 B2 | 6/2014 | Katoh |
| 8,764,308 B2 | 6/2014 | Katoh |
| 8,770,863 B2 | 7/2014 | Cooke et al. |
| 8,869,661 B2 | 10/2014 | Opstad |
| 9,052,474 B2 | 6/2015 | Jiang et al. |
| 9,063,296 B2 | 6/2015 | Dong et al. |
| 9,250,402 B2 | 2/2016 | Ishii et al. |
| 9,310,569 B2 | 4/2016 | Lee |
| 9,366,829 B2 | 6/2016 | Czosnowski et al. |
| 9,411,110 B2 | 8/2016 | Barnette, Jr. et al. |
| 9,448,370 B2 | 9/2016 | Xue et al. |
| 9,465,172 B2 | 10/2016 | Shih |
| 9,494,744 B2 | 11/2016 | De Jong |
| 9,548,557 B2 | 1/2017 | Liu |
| 9,551,842 B2 | 1/2017 | Theuerkorn |
| 9,557,495 B2 | 1/2017 | Raven et al. |
| 9,829,653 B1 | 1/2017 | Raven et al. |
| 9,568,686 B2 | 2/2017 | Fewkes et al. |
| 9,581,768 B1 | 2/2017 | Baca et al. |
| 9,599,778 B2 | 3/2017 | Wong et al. |
| 9,658,409 B2 | 5/2017 | Gniadek et al. |
| 9,678,283 B1 | 6/2017 | Chang et al. |
| 9,684,130 B2 | 6/2017 | Veatch et al. |
| 9,684,136 B2 | 6/2017 | Cline et al. |
| 9,684,313 B2 | 6/2017 | Chajec |
| 9,709,753 B1 | 7/2017 | Chang et al. |
| 9,778,425 B2 | 10/2017 | Nguyen et al. |
| 9,829,644 B2 | 11/2017 | Nguyen et al. |
| 9,829,645 B2 | 11/2017 | Nguyen et al. |
| 9,869,825 B2 | 1/2018 | Bailey et al. |
| 9,880,361 B2 | 1/2018 | Childers et al. |
| 9,946,035 B2 | 4/2018 | Gustafson et al. |
| 9,971,103 B2 | 5/2018 | De Jong et al. |
| 9,989,711 B2 | 6/2018 | Ott et al. |
| 10,031,296 B2 | 7/2018 | Good |
| 10,067,301 B2 | 9/2018 | Murray et al. |
| 10,114,180 B2 | 9/2018 | Murray et al. |
| 10,107,972 B1 | 10/2018 | Gniadek |
| 10,146,011 B2 | 12/2018 | Nhep |
| 10,281,668 B2 | 5/2019 | Takano et al. |
| 10,281,669 B2 | 5/2019 | Takano et al. |
| 2002/0168148 A1 | 11/2002 | Gilliland et al. |
| 2002/0172467 A1 | 11/2002 | Anderson et al. |
| 2002/0191919 A1 | 12/2002 | Nolan |
| 2003/0053787 A1 | 3/2003 | Lee |
| 2003/0063862 A1 | 4/2003 | Fillion et al. |
| 2003/0157825 A1 | 8/2003 | Kane |
| 2003/0215171 A1* | 11/2003 | Lampert ............ G02B 6/3812 385/11 |
| 2003/0215190 A1* | 11/2003 | Lampert ............ G02B 6/3812 385/77 |
| 2004/0052473 A1 | 3/2004 | Seo et al. |
| 2004/0109646 A1 | 6/2004 | Anderson et al. |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich et al. |
| 2005/0036744 A1 | 2/2005 | Caveney et al. |
| 2005/0111796 A1 | 5/2005 | Matasek |
| 2005/0141817 A1 | 6/2005 | Yazaki |
| 2006/0013539 A1 | 1/2006 | Thaler et al. |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki et al. |
| 2006/0160429 A1 | 7/2006 | Daweidczyk et al. |
| 2006/0193562 A1 | 8/2006 | Theuerkorn |
| 2006/0269194 A1 | 11/2006 | Luther et al. |
| 2006/0274411 A1 | 12/2006 | Yamauichi |
| 2007/0025665 A1 | 2/2007 | Dean, Jr. et al. |
| 2007/0028409 A1 | 2/2007 | Yamada |
| 2007/0079854 A1 | 4/2007 | You |
| 2007/0098329 A1 | 5/2007 | Shimoji et al. |
| 2007/0149028 A1 | 6/2007 | Yu et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0056647 A1 | 3/2008 | Margolin et al. |
| 2008/0064334 A1 | 3/2008 | Hamadi et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022467 A1 | 1/2009 | De Jong et al. |
| 2009/0028507 A1 | 1/2009 | Jones et al. |
| 2009/0046981 A1* | 2/2009 | Margolin ............ G02B 6/3825 385/70 |
| 2009/0047818 A1 | 2/2009 | Irwin et al. |
| 2009/0092360 A1 | 4/2009 | Lin et al. |
| 2009/0176401 A1 | 7/2009 | Gu |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2009/0220200 A1 | 9/2009 | Sheau Tung Wong et al. |
| 2009/0290839 A1 | 11/2009 | Lin et al. |
| 2009/0290938 A1 | 11/2009 | Asaoka et al. |
| 2010/0034502 A1 | 2/2010 | Lu et al. |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1 | 9/2010 | de jonge et al. |
| 2010/0247041 A1 | 9/2010 | Szilagyi |
| 2010/0284656 A1 | 11/2010 | Morra et al. |
| 2010/0322561 A1 | 12/2010 | Lin et al. |
| 2011/0044588 A1 | 2/2011 | Larson et al. |
| 2011/0058773 A1 | 3/2011 | Peterhans et al. |
| 2011/0129186 A1* | 6/2011 | Lewallen ............ G02B 6/38875 385/59 |
| 2011/0131801 A1 | 6/2011 | Nelson et al. |
| 2011/0155810 A1 | 6/2011 | Taniguchi et al. |
| 2011/0177710 A1 | 7/2011 | Tobey |
| 2011/0239220 A1 | 9/2011 | Gibson et al. |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2012/0308183 A1 | 12/2012 | Irwin et al. |
| 2012/0328248 A1 | 12/2012 | Larson et al. |
| 2013/0019423 A1 | 1/2013 | Srutkowski |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0101258 A1 | 4/2013 | Hikosaka et al. |
| 2013/0121653 A1 | 5/2013 | Shitama et al. |
| 2013/0170797 A1 | 7/2013 | Ott |
| 2013/0183012 A1 | 7/2013 | Cabanne Lopez et al. |
| 2013/0216185 A1 | 8/2013 | Klavuhn et al. |

(56) References Cited

U.S. PATENT DOCUMENTS

| | | | |
|---|---|---|---|
| 2013/0259429 A1 | 10/2013 | Czosnowski et al. | |
| 2013/0308915 A1 | 11/2013 | Buff et al. | |
| 2013/0322825 A1 | 12/2013 | Cooke et al. | |
| 2014/0016901 A1 | 1/2014 | Lambourn et al. | |
| 2014/0023322 A1* | 1/2014 | Gniadek | G02B 6/3825 |
| | | | 385/56 |
| 2014/0050446 A1 | 2/2014 | Chang | |
| 2014/0056562 A1 | 2/2014 | Limbert et al. | |
| 2014/0133808 A1 | 5/2014 | Hill et al. | |
| 2014/0153878 A1* | 6/2014 | Mullaney | G02B 6/3831 |
| | | | 385/78 |
| 2014/0169727 A1 | 6/2014 | Veatch et al. | |
| 2014/0219621 A1 | 8/2014 | Barnette, Jr. et al. | |
| 2014/0226946 A1 | 8/2014 | Cooke et al. | |
| 2014/0241644 A1 | 8/2014 | Kang et al. | |
| 2014/0241678 A1 | 8/2014 | Bringuier et al. | |
| 2014/0241688 A1 | 8/2014 | Isenhour et al. | |
| 2014/0334780 A1 | 11/2014 | Nguyen et al. | |
| 2014/0348477 A1 | 11/2014 | Chang | |
| 2015/0003785 A1* | 1/2015 | Raven | G02B 6/3825 |
| | | | 385/62 |
| 2015/0003788 A1 | 1/2015 | Chen et al. | |
| 2015/0111417 A1 | 4/2015 | Vanderwoud | |
| 2015/0177463 A1 | 6/2015 | Lee et al. | |
| 2015/0198766 A1 | 7/2015 | Takahashi et al. | |
| 2015/0212282 A1 | 7/2015 | Lin | |
| 2015/0241644 A1 | 8/2015 | Lee | |
| 2015/0301294 A1 | 10/2015 | Chang et al. | |
| 2015/0331201 A1 | 11/2015 | Takano et al. | |
| 2015/0355417 A1 | 12/2015 | Takano et al. | |
| 2015/0362686 A1* | 12/2015 | Wang | G02B 6/4292 |
| | | | 385/89 |
| 2015/0370021 A1 | 12/2015 | Chan | |
| 2015/0378113 A1 | 12/2015 | Good et al. | |
| 2016/0131849 A1 | 5/2016 | Takano et al. | |
| 2016/0139343 A1 | 5/2016 | Dean, Jr. et al. | |
| 2016/0161681 A1 | 6/2016 | Banal, Jr. et al. | |
| 2016/0172852 A1 | 6/2016 | Tamura et al. | |
| 2016/0178852 A1 | 6/2016 | Takano et al. | |
| 2016/0195682 A1 | 7/2016 | Takano et al. | |
| 2016/0231512 A1 | 8/2016 | Seki | |
| 2016/0259135 A1 | 9/2016 | Gniadek et al. | |
| 2016/0266326 A1 | 9/2016 | Gniadek | |
| 2016/0291262 A1 | 10/2016 | Chang et al. | |
| 2016/0320572 A1 | 11/2016 | Gniadek | |
| 2016/0349458 A1 | 12/2016 | Murray et al. | |
| 2016/0370545 A1 | 12/2016 | Jiang et al. | |
| 2017/0003458 A1 | 1/2017 | Gniadek | |
| 2017/0160496 A1 | 6/2017 | De Jong et al. | |
| 2017/0205587 A1 | 7/2017 | Chang et al. | |
| 2017/0205590 A1 | 7/2017 | Bailey et al. | |
| 2017/0205591 A1 | 7/2017 | Takano et al. | |
| 2017/0212313 A1 | 7/2017 | Elenabaas et al. | |
| 2017/0212316 A1* | 7/2017 | Takano | G02B 6/3897 |
| 2017/0254961 A1 | 9/2017 | Kamada et al. | |
| 2017/0276275 A1 | 9/2017 | Beemer et al. | |
| 2017/0276887 A1 | 9/2017 | Allen | |
| 2017/0277059 A1 | 9/2017 | Miura et al. | |
| 2017/0343740 A1 | 11/2017 | Nguyen | |
| 2018/0003910 A1* | 1/2018 | Menguy | G02B 6/443 |
| 2018/0128988 A1 | 5/2018 | Chang et al. | |
| 2018/0156988 A1 | 6/2018 | Gniadek et al. | |
| 2018/0172923 A1 | 6/2018 | Bauco et al. | |
| 2018/0252872 A1* | 9/2018 | Chen | G02B 6/3825 |
| 2018/0341069 A1 | 11/2018 | Takano et al. | |
| 2019/0064447 A1 | 2/2019 | Chang et al. | |
| 2019/0204513 A1 | 7/2019 | Davidson et al. | |
| 2020/0183097 A1 | 6/2020 | Chang et al. | |
| 2020/0285001 A1* | 9/2020 | Childers | G02B 6/3857 |

FOREIGN PATENT DOCUMENTS

| | | |
|---|---|---|
| CN | 201383588 Y | 1/2010 |
| CN | 2026500189 U | 12/2013 |
| DE | 19507669 A1 | 9/1996 |
| DE | 202006011910 U1 | 3/2007 |
| DE | 102006019335 A1 | 10/2007 |
| EP | 1074868 A1 | 7/2001 |
| EP | 1 211 537 A3 | 6/2002 |
| EP | 1211537 A2 | 6/2002 |
| EP | 1245980 A1 | 10/2002 |
| EP | 1566674 A2 | 8/2005 |
| GB | 2111240 A | 6/1983 |
| JP | 2000089059 A | 3/2000 |
| JP | 03752331 B2 | 3/2006 |
| JP | 2009229545 A | 10/2009 |
| JP | 2009276493 A | 11/2009 |
| JP | 04377820 B2 | 12/2009 |
| KR | 1371686 B1 | 3/2014 |
| TW | 200821653 A | 5/2008 |
| WO | 20017/9904 A2 | 10/2001 |
| WO | 20010799042 A2 | 10/2001 |
| WO | 2004/027485 A1 | 4/2004 |
| WO | 2006007120 A1 | 1/2006 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015103783 A1 | 7/2015 |
| WO | 2015/191024 A1 | 12/2015 |
| WO | 2016/019993 A1 | 2/2016 |
| WO | 2016/148741 A1 | 9/2016 |
| WO | 2019126333 A1 | 6/2019 |

OTHER PUBLICATIONS

International Search Report and Written Opinion, Application No. PCT/US2019/013861, dated Apr. 8, 2019, pp. 15.
Fiber Optic Connectors Tutorial, 2018, pp. 20.
Fiber Optic Glossary, Feb. 29, 2016, pp. 93.
Fiber Optic Interconnect Solutions, Tactical Fiber Optical Connectors, Cables and Termini 2006, Glenair, Inc., Glendale, California, www.mps-electronics.de, pp. 232.
Fiber Optic Products Catalog Nov. 2007, Tyco Electronics Corporation, Harrisburg, Pennsylvania, www.ampnetconnect.com, pp. 204.
Fiber Optic Connectors and Assemblies Catalog 2009, Huber & Suhner Fiver Optics, Herisau, Switzerland, www.nubersuhner.com, pp. 104.
International Search Report and Written Opinion for Application No. PCT/US2018/62406 dated Mar. 18, 2019, 12, pages, United States.
PCT/US2018/062405 International Search Report dated Apr. 3, 2019.
PCT /US2018/062405 The written Opinion dated Apr. 3, 2019.
PCT/IB2018/056133 Written Opinion dated Jan. 3, 2019.
PCY/IB/056133 Search Report dated Jan. 3, 2019.
Non-Final Office Action, U.S. Appl. No. 16/035,695, dated Sep. 28, 2018, pp. 7.
International Search Report and Written Opinion, Application No. PCT/US19/24718, dated Jun. 26, 2019, pp. 7.
International Search Report and Written Opinion for Application No. PCT/US2019/40700 dated Sep. 27, 2019, 12, pages, United States.
International Search Report and Written Opinion for Application No. PCT/US2019/50895 dated Jan. 6, 2020, 12, pages, United States.
International Search Report and Written Opinion for Application No. PCT/US2019/50909 dated Dec. 17, 2019, 11, pages, United States.
International Search Report and Written Opinion for Application No. PCT/US2019/56564 dated Jan. 14, 2020, 14, pages, United States.
International Search Report and Written Opinion, Application No. PCT/US19/46397, dated Nov. 12, 2019, pp. 6.
International Preliminary Report on Patentability for PCT/US2019/022940 dated Oct. 1, 2020, 11 pages.

(56) References Cited

OTHER PUBLICATIONS

International Preliminary Report on Patentability, Application No. PCT/US2019/013861, dated Oct. 8, 2020 13 pages.

* cited by examiner

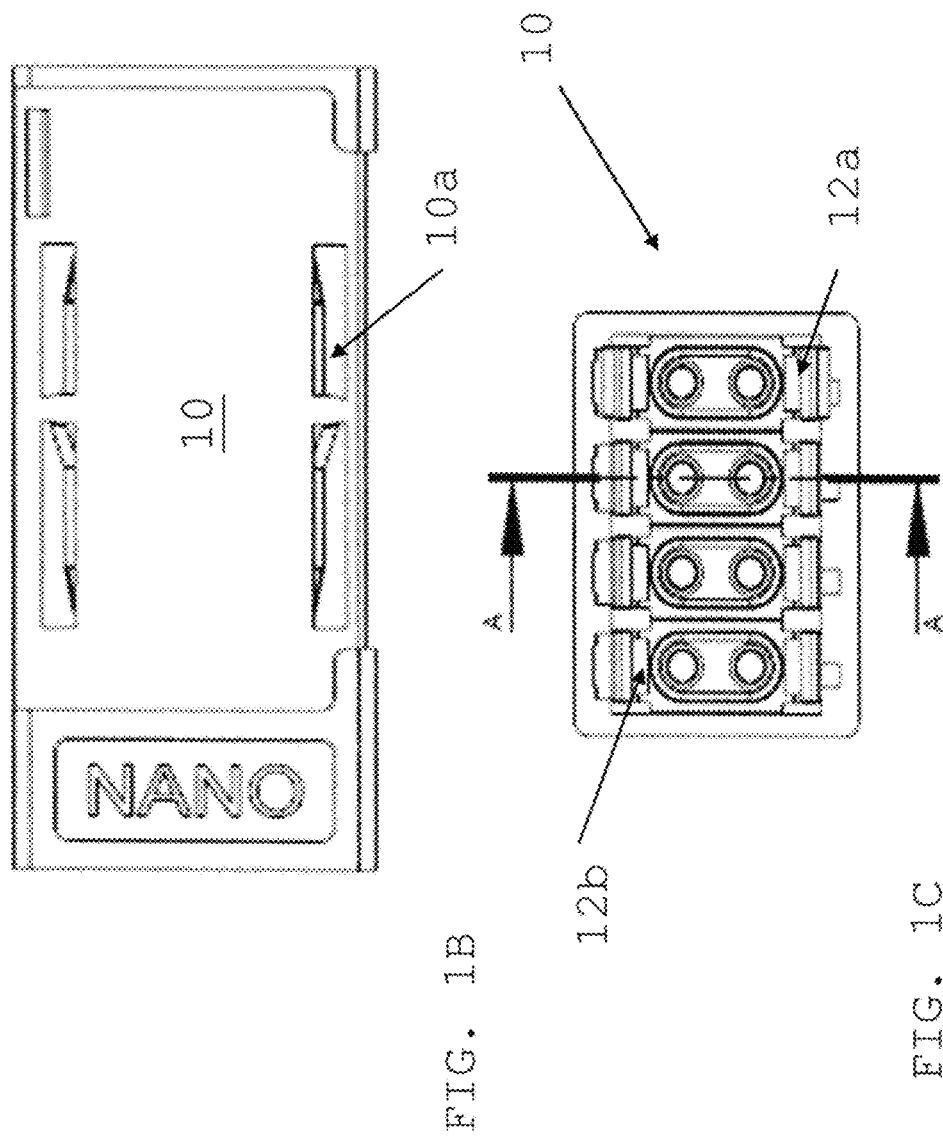

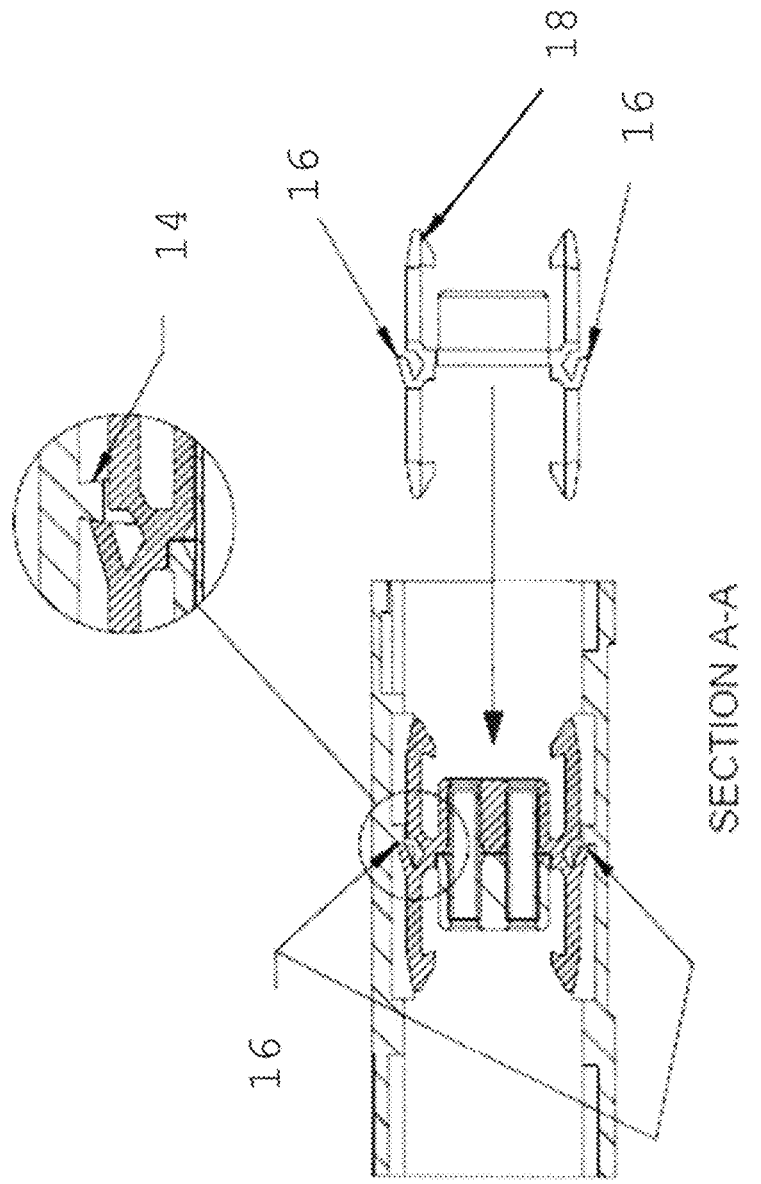

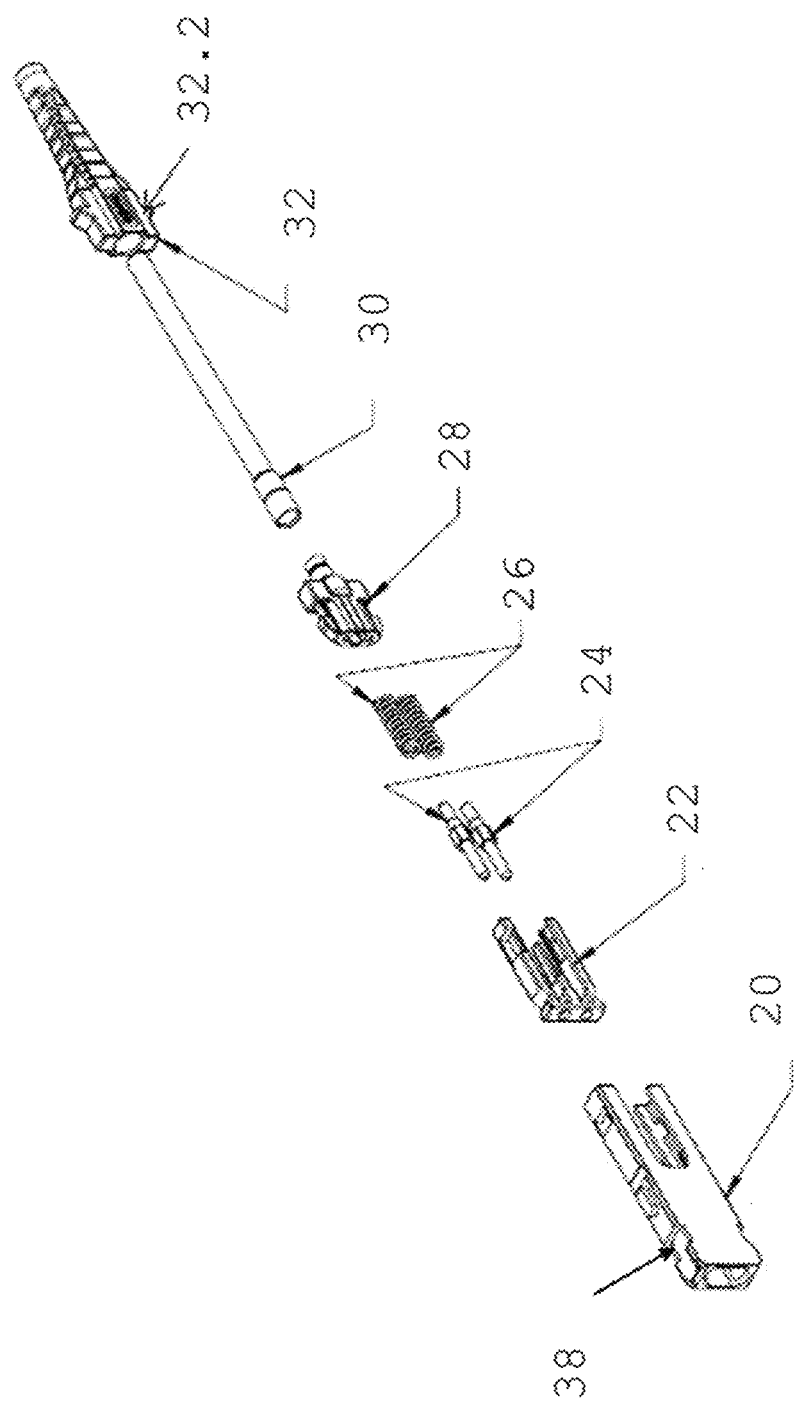

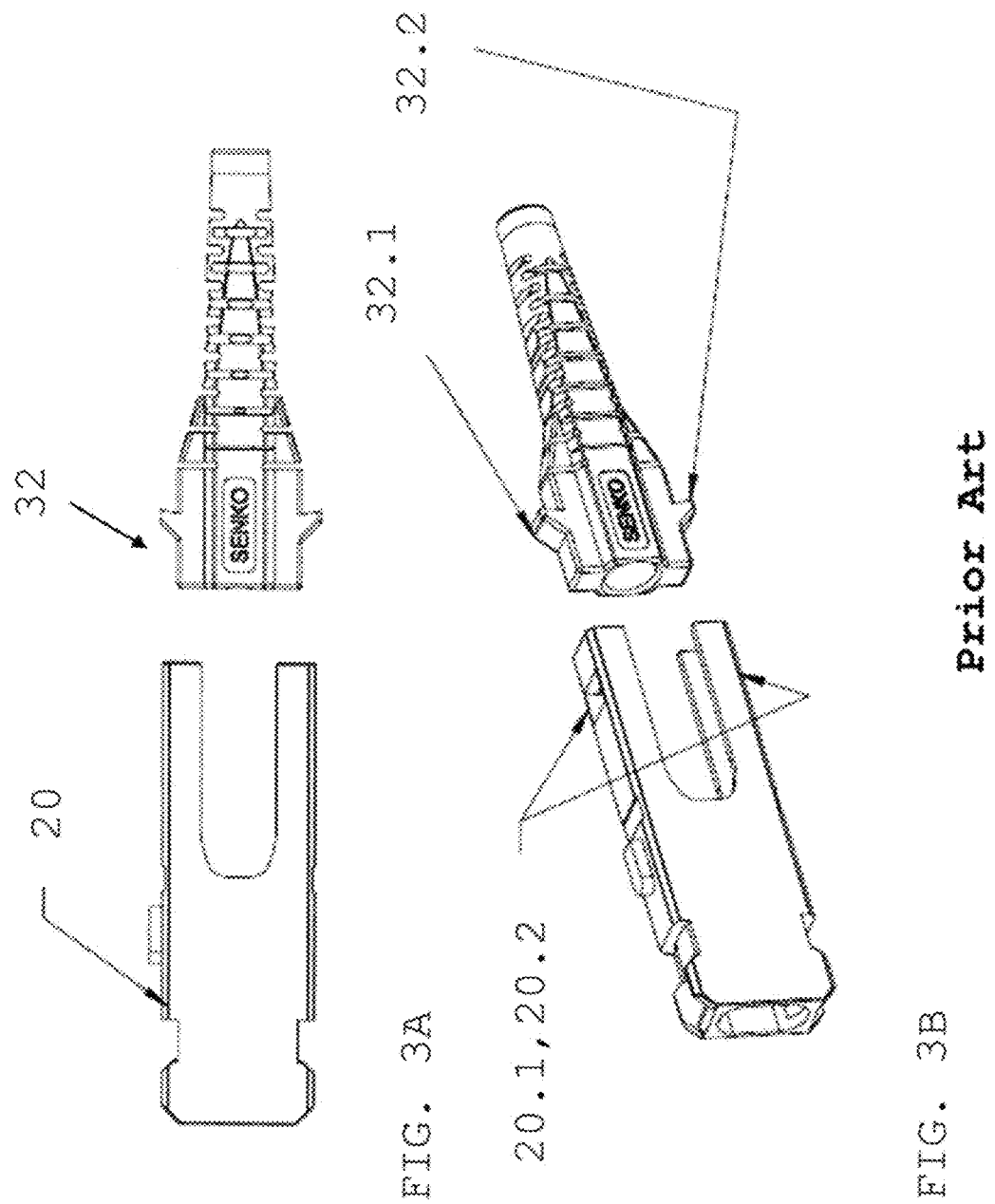

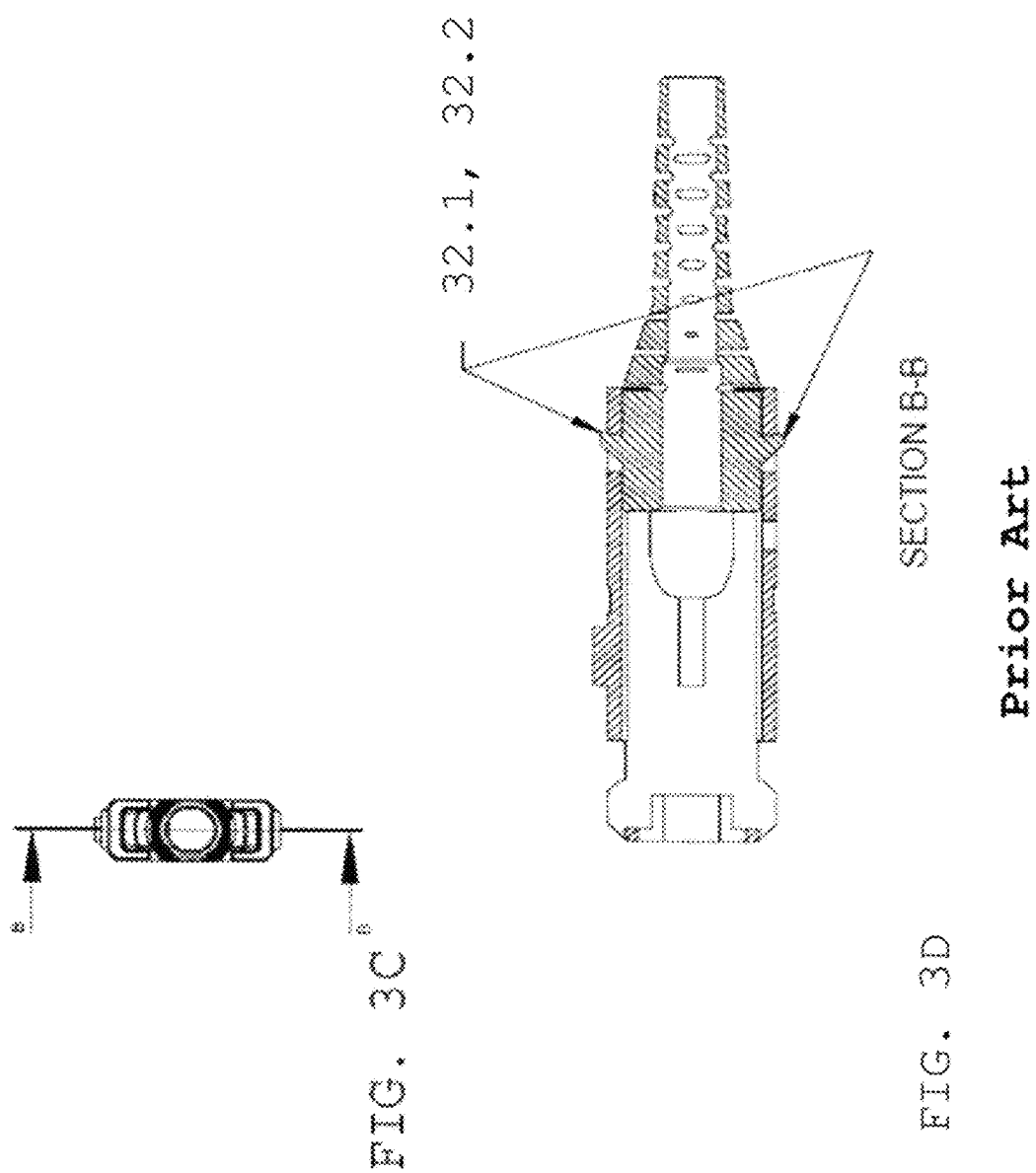

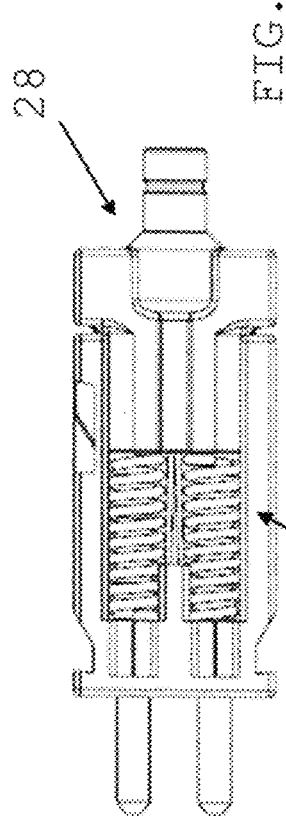
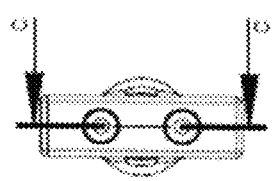
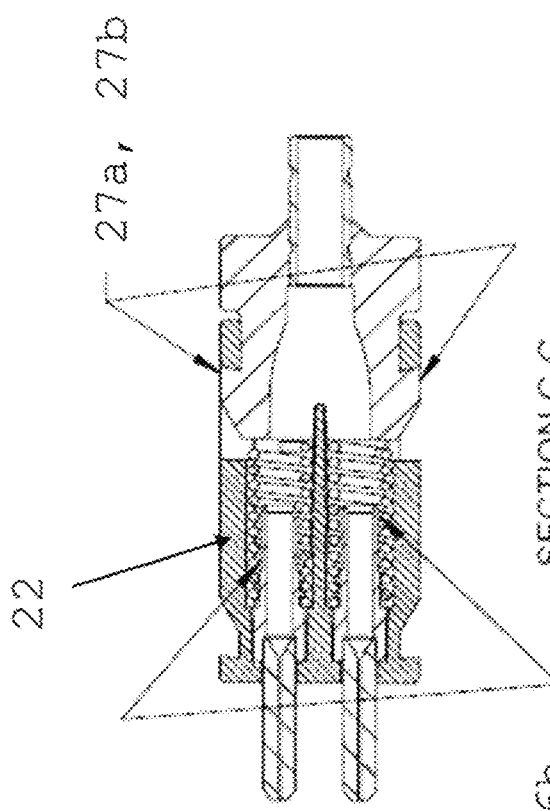
FIG. 4B.2
FIG. 4C
FIG. 4B.1
Prior Art

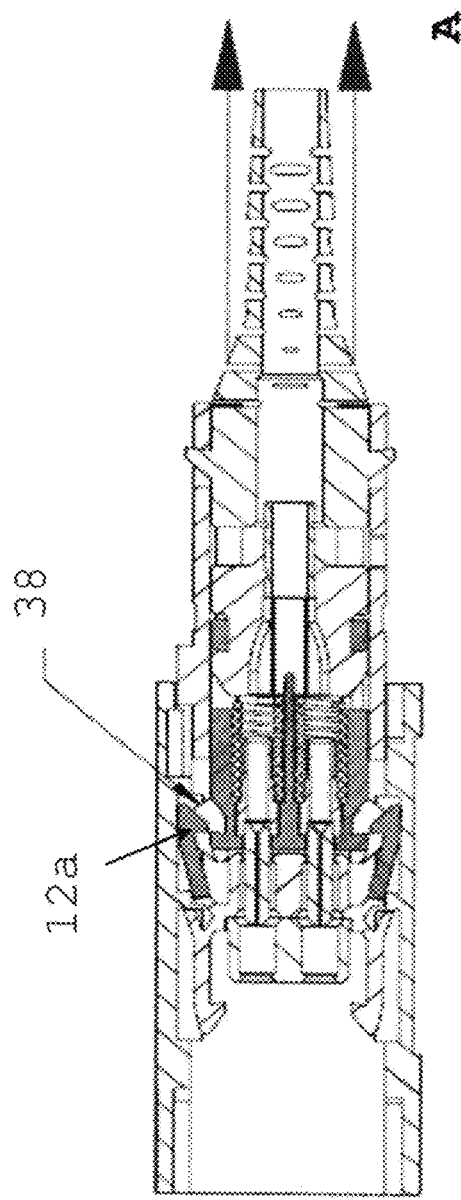

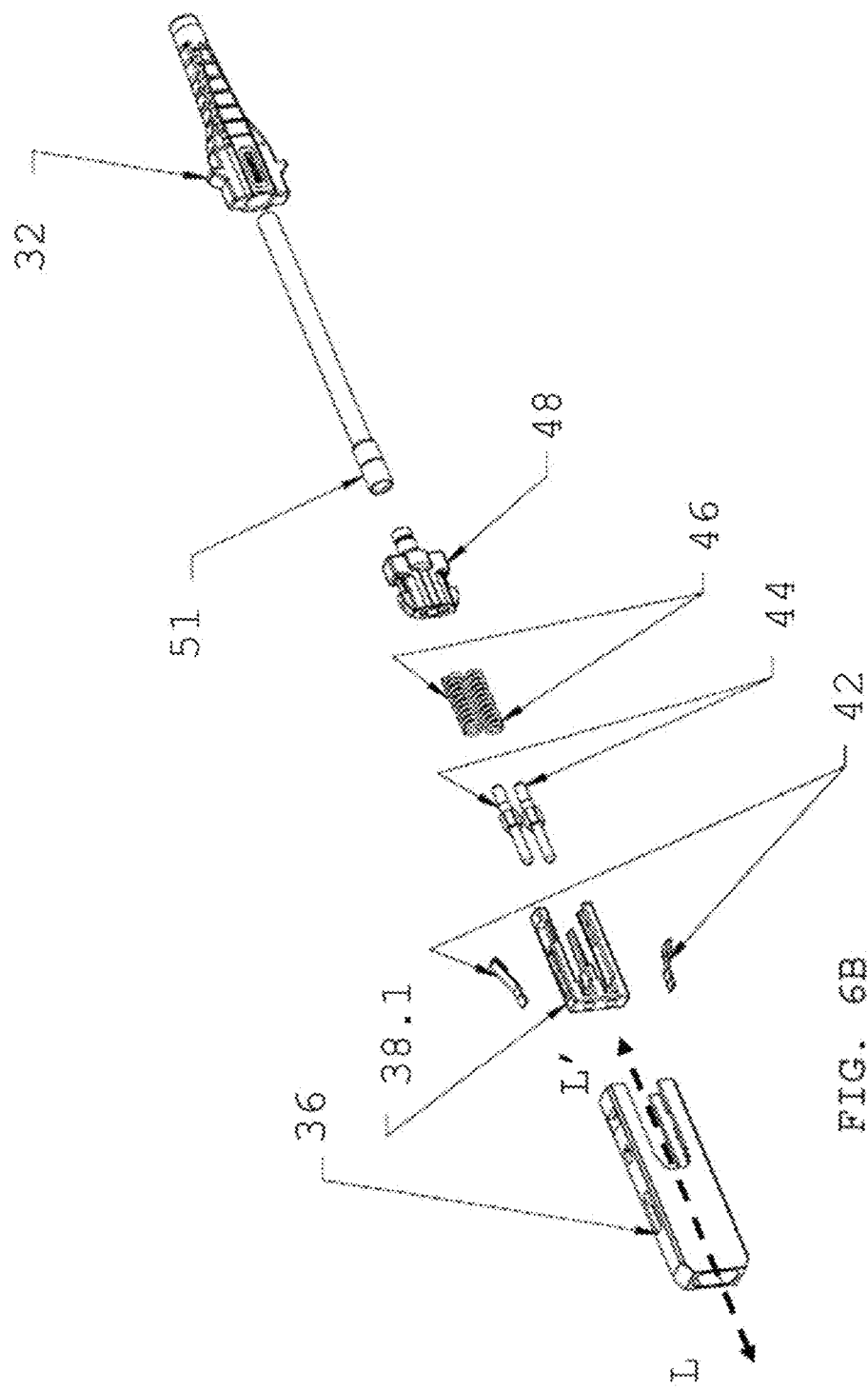

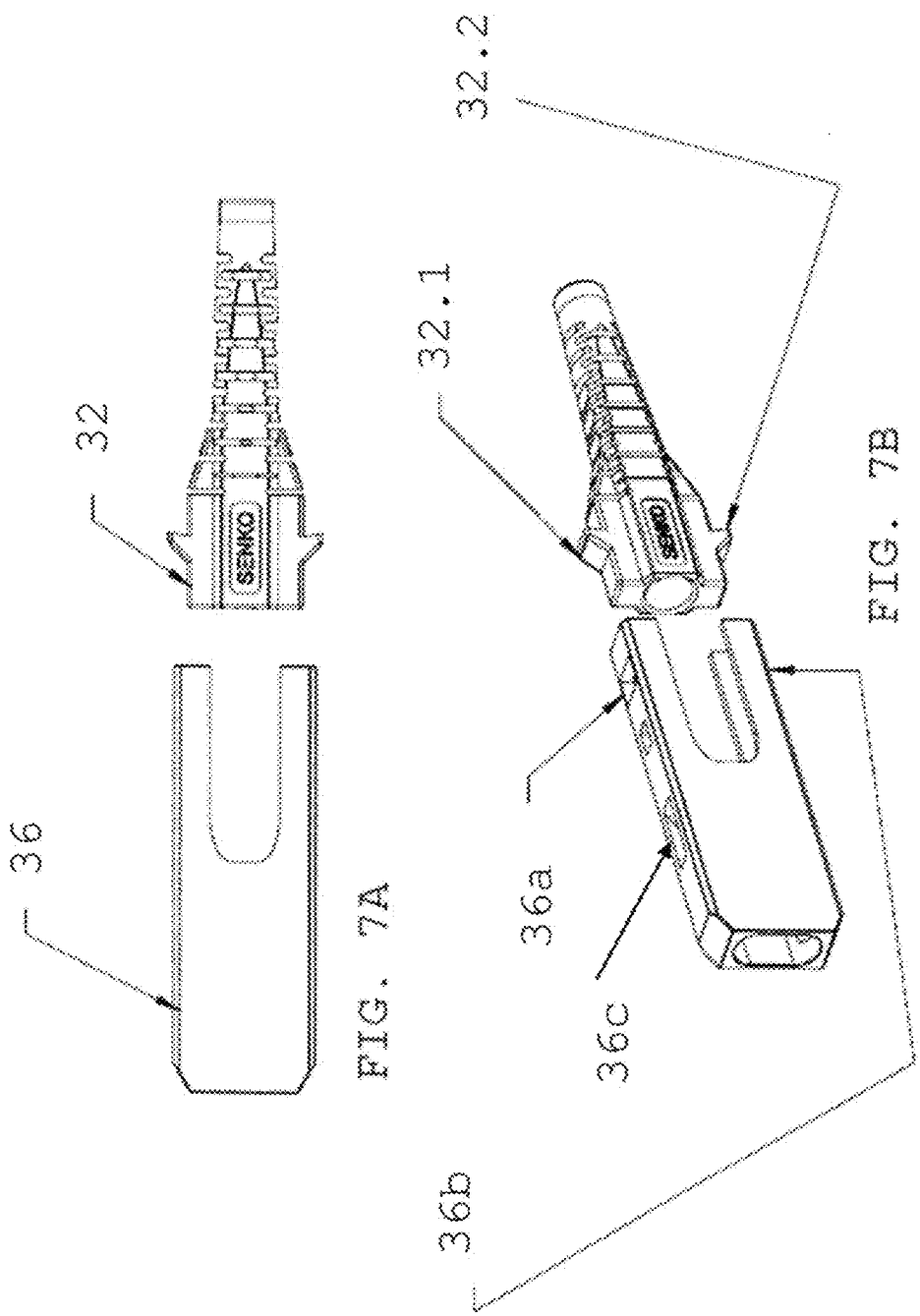

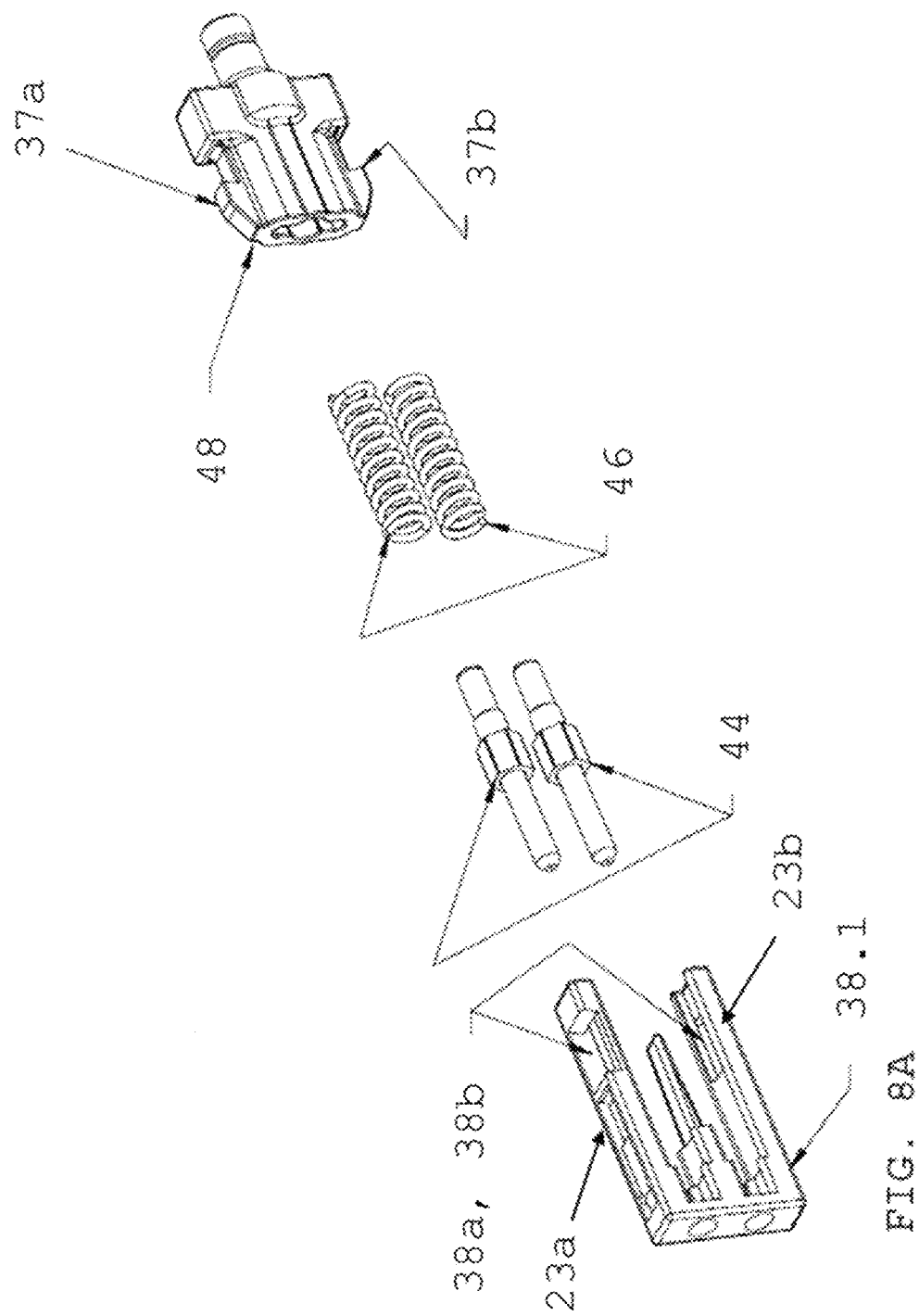

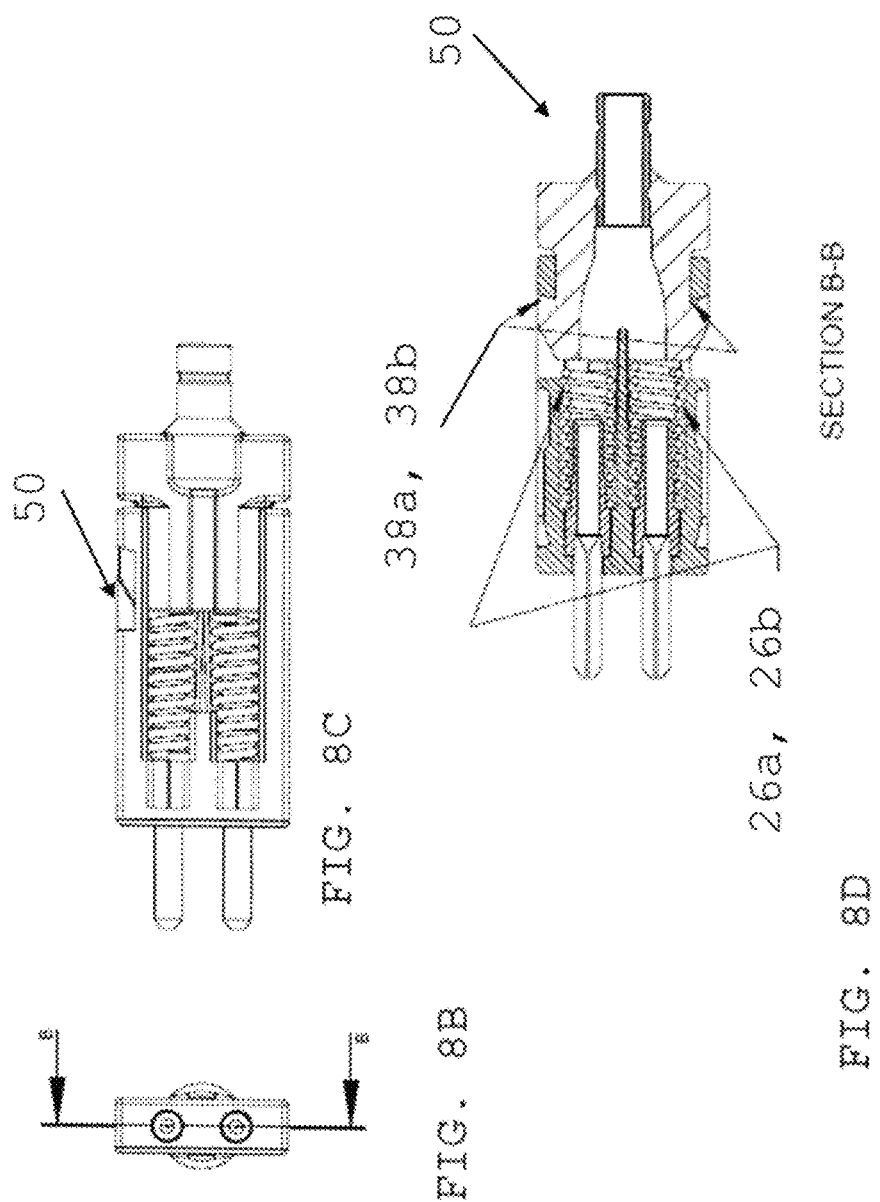

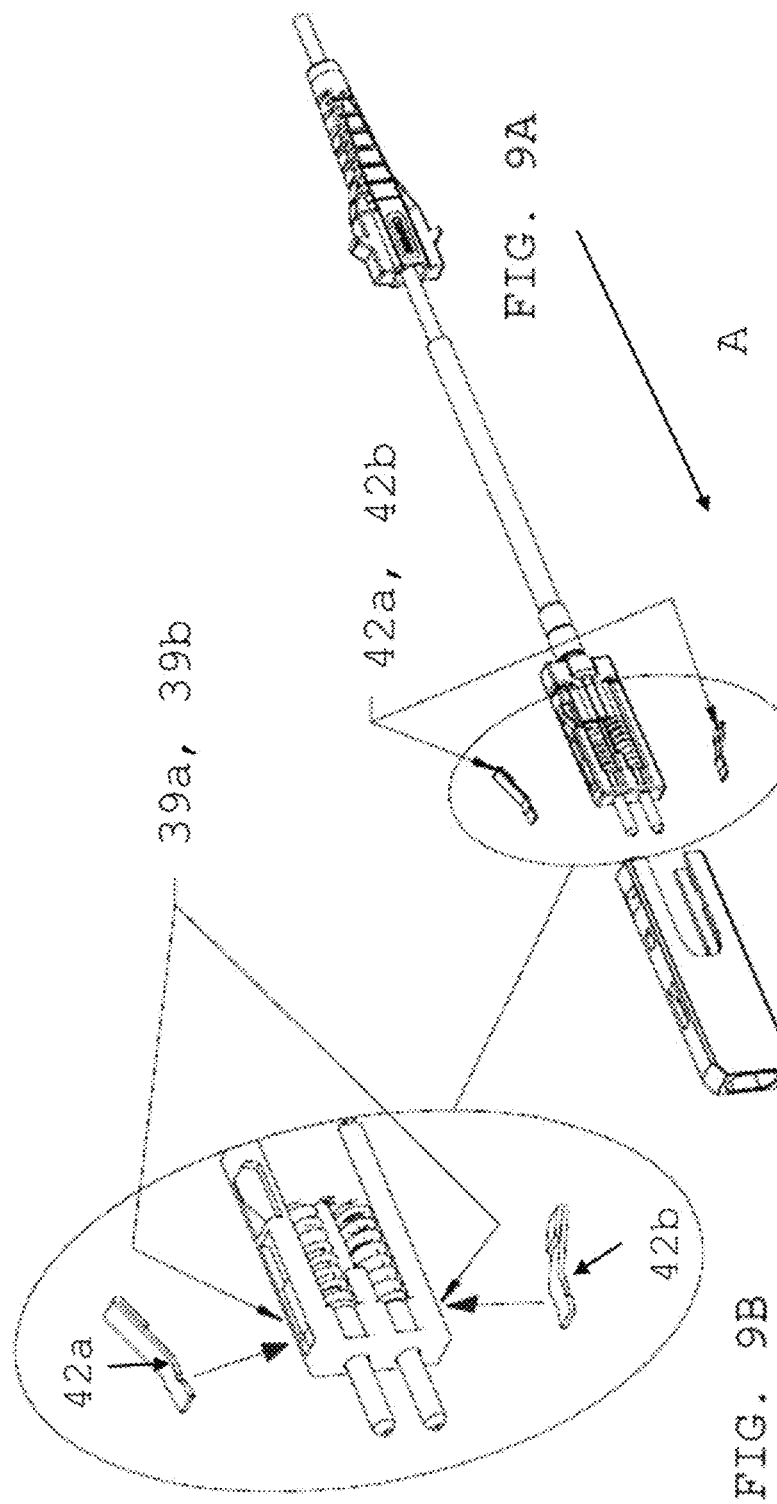

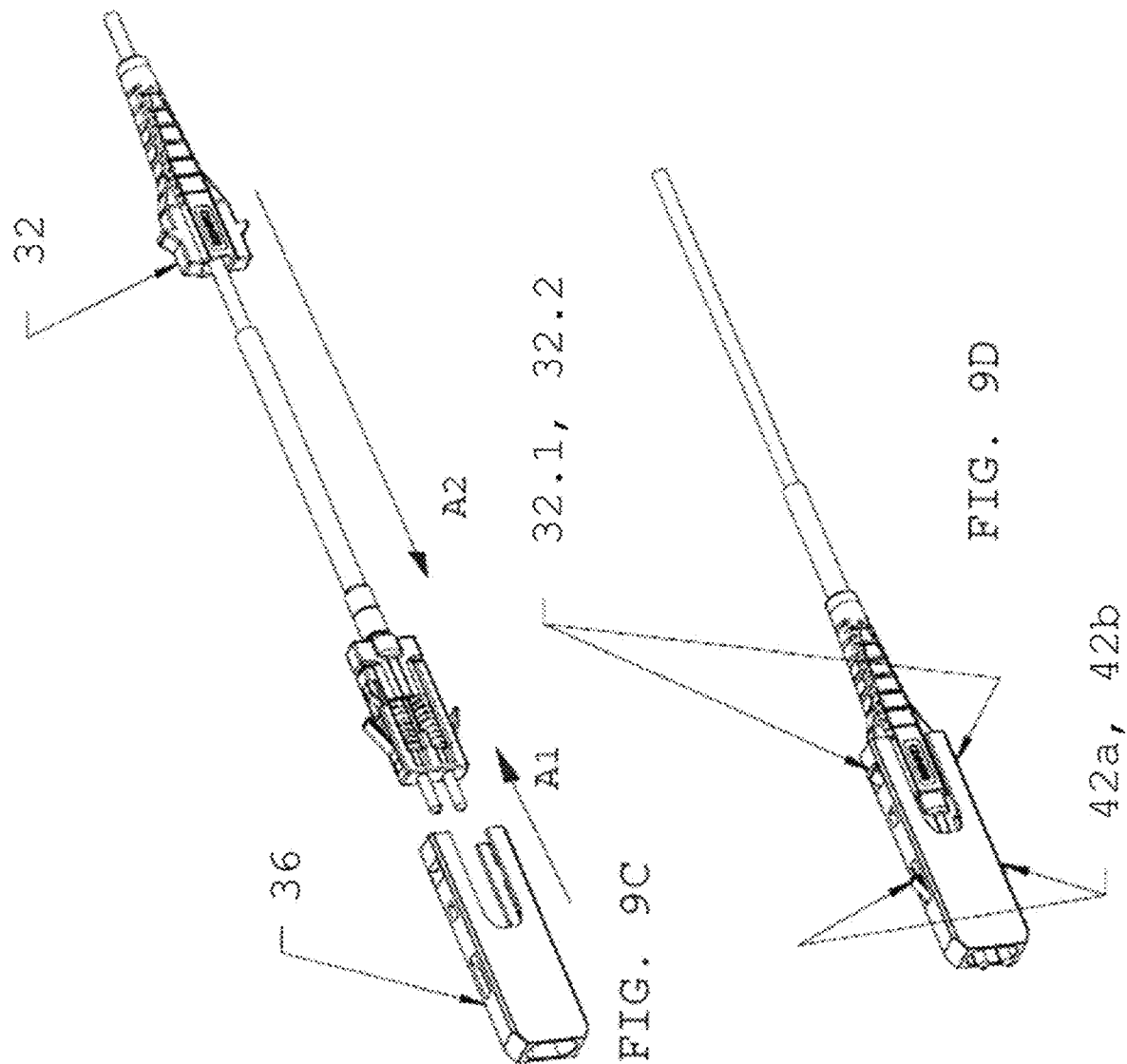

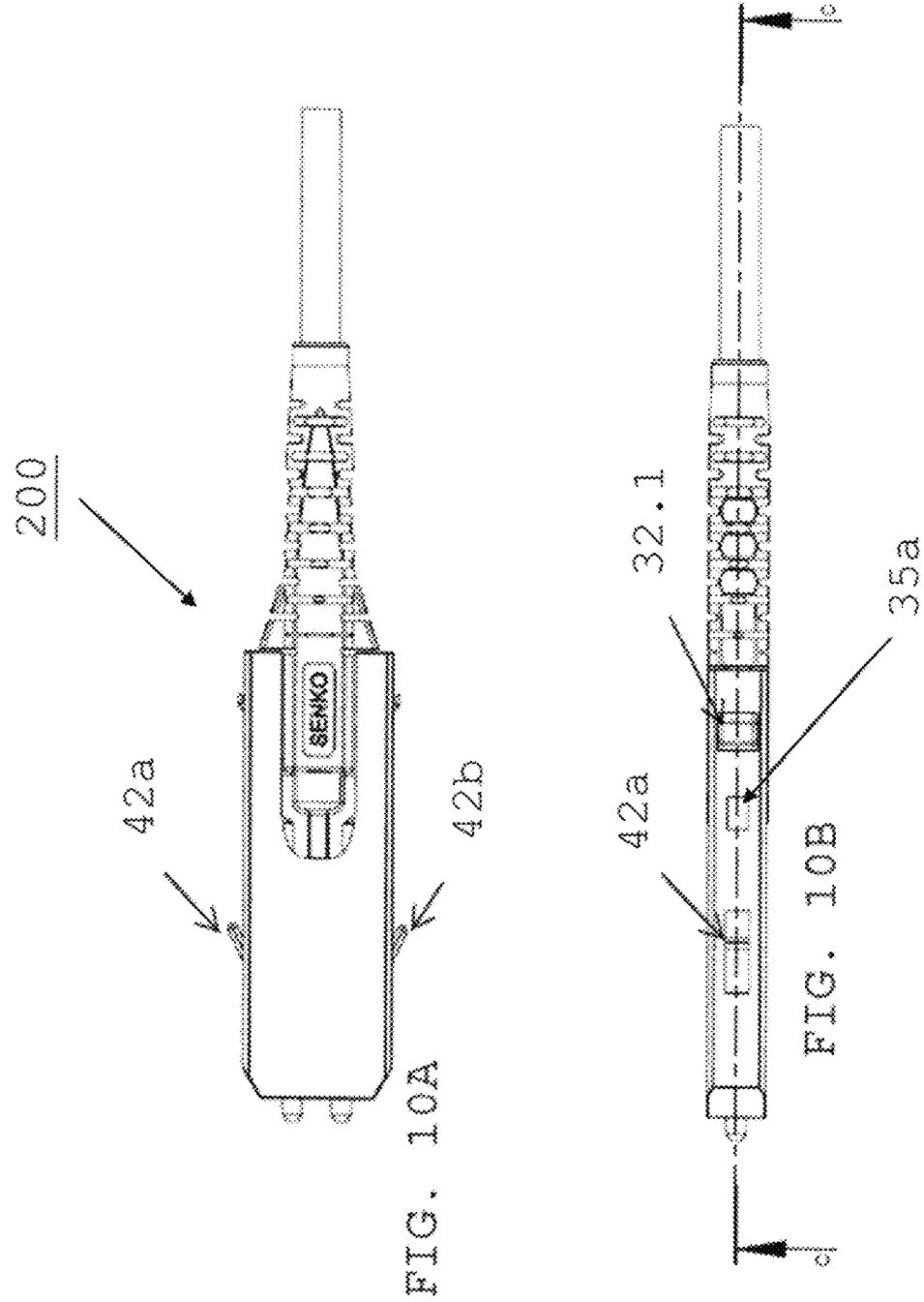

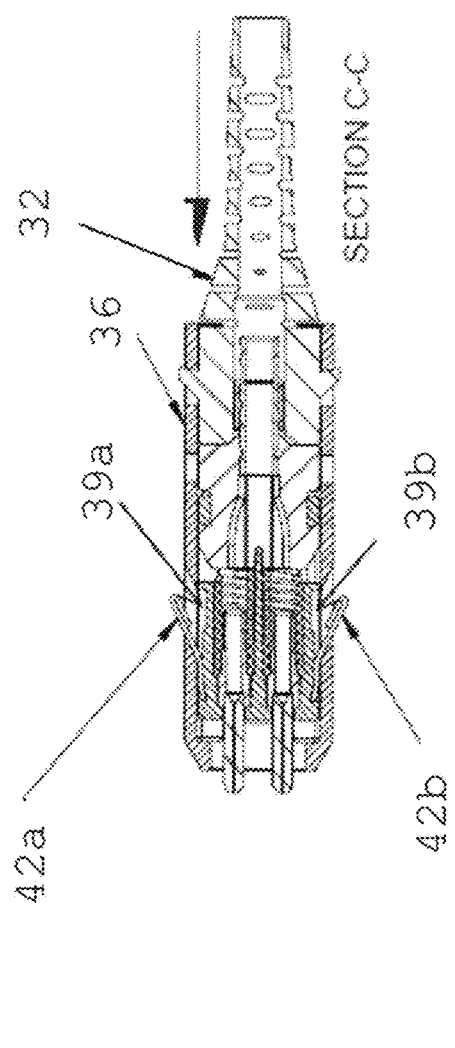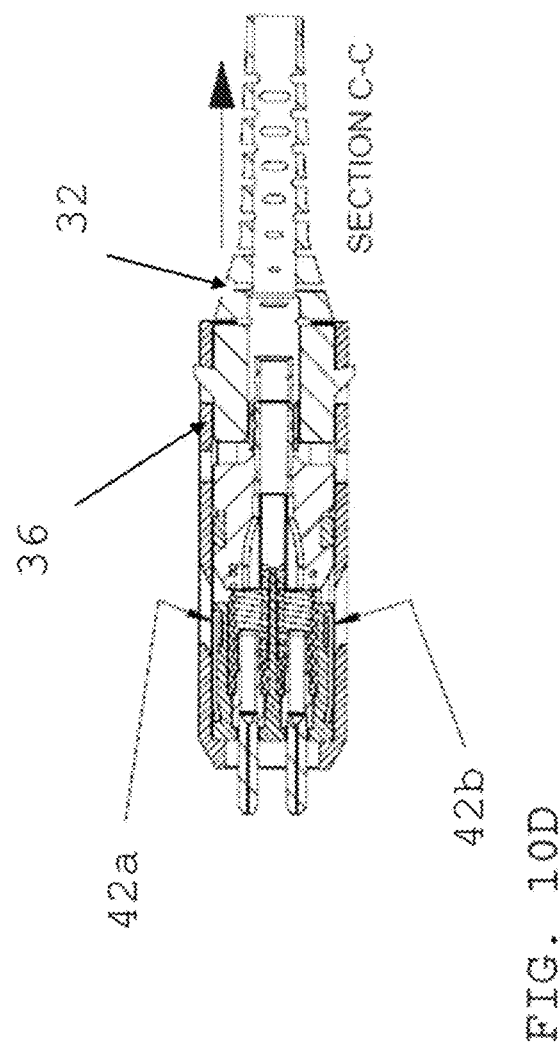

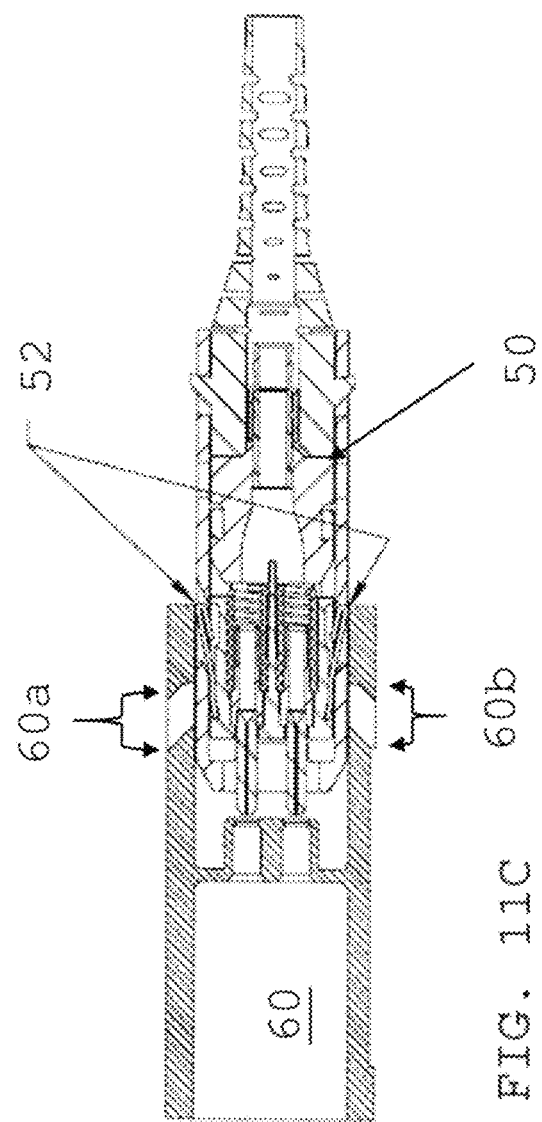

SMALL FORM FACTOR FIBER OPTIC CONNECTOR WITH RESILIENT LATCHING MECHANISM FOR SECURING WITHIN A HOOK-LESS RECEPTACLE

CROSS-REFERENCE TO RELATED APPLICATIONS

The present application claims the benefit of priority under 35 U.S.C. 119(e) to the filing date of U.S. Provisional Patent Application 62/836,155 filed Apr. 19, 2019, titled, "SMALL FORM FACTOR FIBER OPTIC CONNECTOR WITH RESILIENT LATCHING MECHANISM FOR SECURING TO RECEPTACLE", The contents of which is fully incorporated herein by reference in its entirety.

FIELD OF THE INVENTION

The present disclosure relates generally to ultra-small form factor optical connectors secured with an adapter or optical transceiver both generally called a receptacle.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists: For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor plug able transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication, networks, such as data centers and switching networks, numerous interconnections between mating connectors may be compacted into high-density panels. Panel and connector producers may optimize for such high densities by shrinking the connector size and or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line sight, guiding the tool to the release mechanism may be a time-consuming process. Thus, using a tool may not be effective at reducing support time and increasing the quality of service.

SUMMARY OF THE INVENTION

An optical connector holding a ferrule assembly the assembly may contain two or more LC-type optical ferrules or a single optical ferrule, basis with a spring, and each ferrule having one or more optical fiber therein is provided. The optical connector includes an outer body, an inner front body accommodating the optical ferrule assembly, the inner front body has open sidewalls, resilient metal latches configured to be secured between the inner front body and outer housing, ferrule springs for urging the optical ferrules and flanges within the inner body, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes does not have an internal receptacle hook configured, as in U.S. Pat. No. 10,281,669B2 to Takano the subject matter of which is fully incorporated herein by reference, and an outer housing with an opening that accommodates the receptacle hook in a flexed position as the optical connector makes connection with the mating receptacle by introducing the receptacle hook into a receptacle hook recess.

Other aspects and features will be apparent hereinafter.

BRIEF DESCRIPTION OF THE DRAWINGS

FIG. 1B is a perspective side view of an adapter of FIG. 1A;

FIG. 1C is a front view of an adapter of FIG. 1A;

FIG. 1D.1 is a cross-section view along section line A-A of snap-in hooks secured within the adapter of FIG. 1A;

FIG. 1D.2 is a zoomed view of a snap-in hook secured within the adapter port;

FIG. 1D.3 is side view of a snap-in hook;

FIG. 2A is an exploded view of a small form factor connector with a latch recess formed as part of the inner housing configured to be secured within the adapter assembly of FIG. 1A;

FIG. 3A is a perspective side view of a small form factor connector and housing;

FIG. 3B is a perspective angled view of a small form factor connector and housing;

FIG. 3C is a front view of FIG. 3B assembled;

FIG. 3D is a cross section view along section line B-B of a small form connector;

FIG. 4B.1 is a front view of FIG. 4A along section line A-A;

FIG. 4B.2 is a side view of FIG. 4B.1;

FIG. 4C is a cross-section view along section line C-C of FIG. 4B.1;

FIG. 5D is across-section view of the small form factor connector release from the adapter;

FIG. 6B is an exploded view of FIG. 6A;

FIG. 7A is side view of connector housing and boot of the FIG. 6A connector;

FIG. 7B is a front, side view of FIG. 7A;

FIG. 8A is an exploded view of inner sub-assembly of connector of FIG. 10A without resilient metal latches;

FIG. 8B is front, side view of FIG. 8A assembled along line B-B;

FIG. 8C is a side view of FIG. 8A assembled;

FIG. 8D is a cross-section along line B-B of FIG. 8B;

FIG. 9A is an exploded view of the connector of FIG. 10A with resilient metal latches;

FIG. 9B is a zoomed view of FIG. 9A inner front body with resilient metal latches;

FIG. 9C is an exploded view of FIG. 10A with resilient metal latches;

FIG. 9D is an assembled view of FIG. 10A;

FIG. 10A is a side view of the FIG. 9D;

FIG. 10B is a top view of FIG. 10A with line C-C;

FIG. 10C is a cross-section view along section line C-C of FIG. 10B in a first configuration;

FIG. 10D is a cross-section view along section line CS-C of FIG. 10B in a second configuration;

FIG. 11C is a cross section view of a partial insertion of the connector of FIG. 10A into a hook-less adapter;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow-pitch LC duplex connectors and narrow-width multi-fiber connectors, for use, for example, with future narrow-pitch LC SFPs and future narrow width SFPs. The remote release mechanisms allow use of the narrow-pitch LC duplex connectors and narrow-width multi-fiber connectors in dense arrays of narrow-pitch LC SFPs and narrow-width multi-fiber SFPs.

Figure 1A:
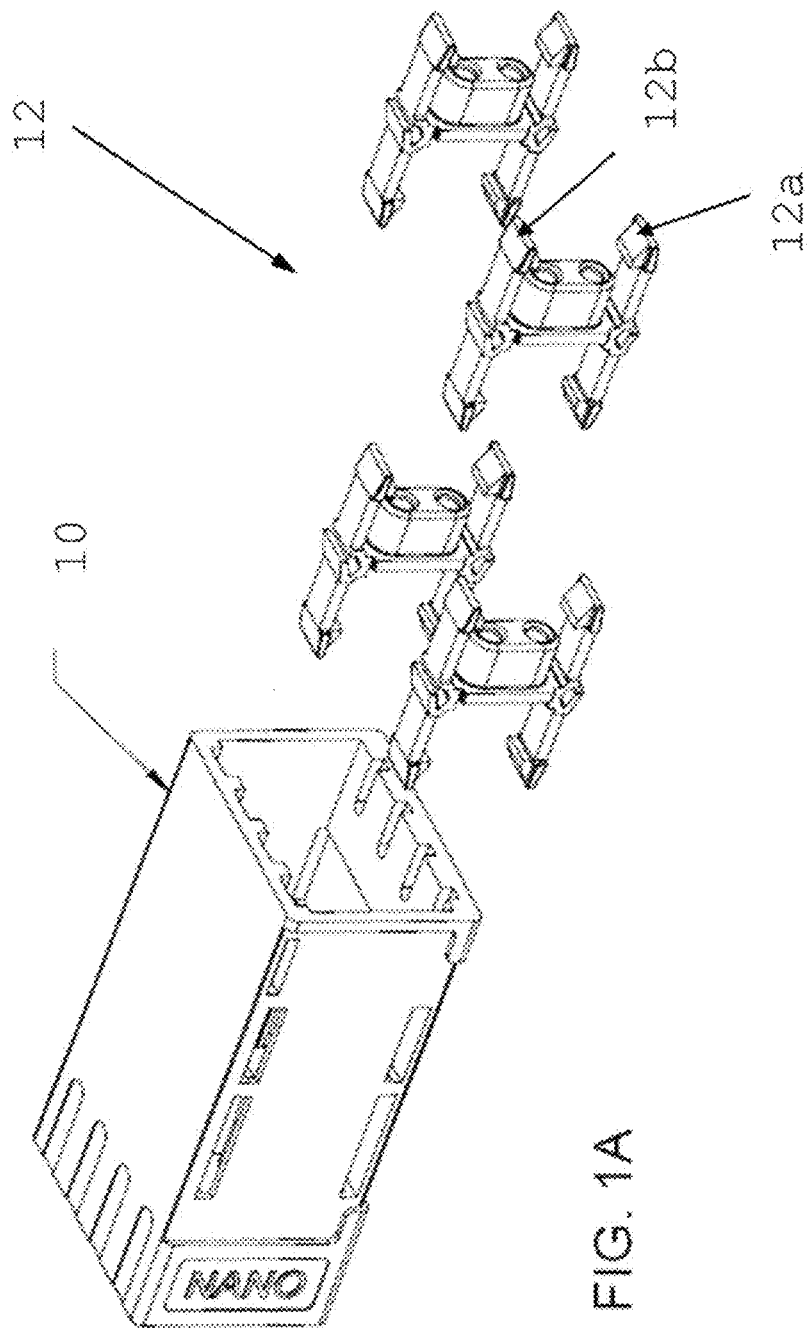
FIG. 1A is a prior art exploded view of an adapter assembly.

FIG. 1A depicts a prior art adapter (10) configured to receive and secured snap-in hooks (12) with a ferrule alignment sleeve, with one snap-in hook per an adapter port. This forms an adapter port with a hook (12) to receive and secure a small-form factor connector as depicted 2B. FIG. 1B is a top view of the adapter (10) of FIG. 1A through cut-outs (10a) that help to secure snap-in hooks within the adapter port. FIG. 1C is a front view of the snap-in hooks (12) within a port defined by spaced apart inner channels within the outer housing wall of the adapter and section line A-A. FIG. 1D.1 is a cross section along line A-A with snap-in hook clip (16) (refer to FIG. 1D.3) secured by an adapter housing internal rib (14), as depicted in FIG. 1D.2 snap-in hook latches. A set of opposing latch hooks (12a, 12b) secure a connector upon insertion of the connector into a port of the adapter. The snap-in hook assembly of FIG. 1D.3 has flexible latch (18) arms to secure the connector.

Figure 2B:
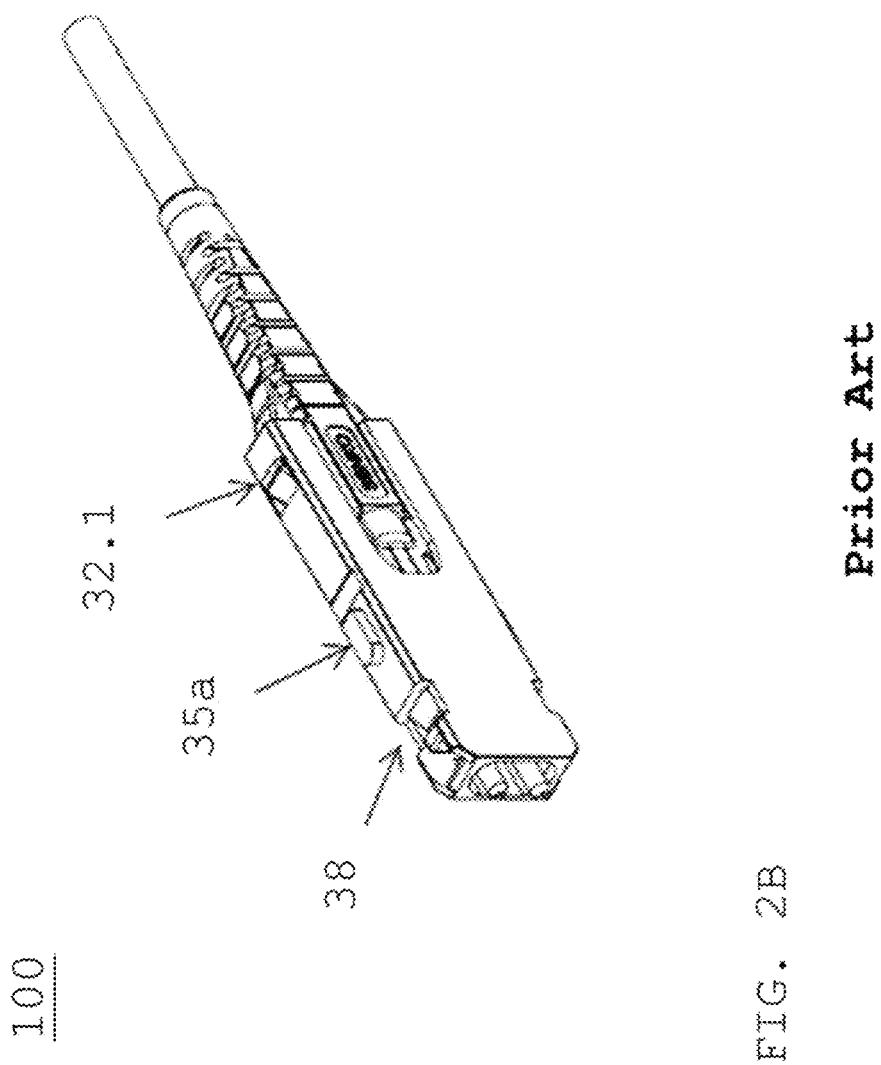
FIG. 2B is a perspective view of the FIG. 2A small form connector with a push-pull boot release.

FIG. 2A depicts an exploded view of a small form factor connector configured to be secured within the adapter (10) of FIG. Snap-in hook latches are secured within opposing recesses a, b) of the inner front body or housing (refer to FIG. 4A) secured within the sliding outer housing (20). FIG. 2A depicts a strain relief boot (32) with opposing boot hooks (32.1, 32.2) (refer to FIG. 3B) to form a push/pull boot, a crimp ring (30) with heat shrink tubing at a distal end, a back-post and spring (28) pushed configured to accept the crimp ring at a proximal end of the crimp, ring (30), a pair of basis springs (26) to bias forward a corresponding flanged ferrules (24) with at least one optical fiber within, the ferrule, and open sidewall, inner housing (22) that accepts and secured the back-post and spring pusher (28) at a distal end of the inner housing (22) with a pair of opposing protrusions on the back-post secured with a pair of corresponding openings at a distal end of the inner housing (22), and a sliding outer housing (20) that accepts the above mentioned assembly when the push/pull boot is secured to the outer housing at a distal end of the housing. The push/pull boot has a pair of opposing hoot hooks (32.1, 32.2) that are secured within a pair of opposing openings (20.1, 20.2) at the distal of the housing (refer to FIG. 3B), and when the hoot hooks (32.1, 32.2) are secured within the housing openings, the connector assembled as shown in FIG. 2B. FIG. 2B depicts the assembled connector (100) with opposing recesses (38) formed within the inner front body and accessible at a proximal end of the connector, the distal end defined by the push/pull boot with opposing boot hooks (32.1, 32.2). The connector outer housing has opposing alignment keys (35a) that align and guide the connector into an adapter port.

FIG. 3A depicts outer housing (20) (sometimes called a slider outer housing) and strain relief boot (32) (also called a push/pull boot) that is secured by the opposing boot latches (32.1, 32.2) (refer to FIG. 3B) at a proximal end of the push/pull boot into latch openings (20.1, 20.2) at a distal end of the of slider outer housing (20) (refer to FIG. 38). FIG. 3C is a front view of the small form factor connector along section line B-1B, FIG. 3D is a cross-section view, along section line B-B of FIG. 3C after boot is secured to distal end of slider housing (20) and depicts boot latches (32.1, 32.2) within openings at a distal end of sliding outer housing. The assembly connector of FIG. 3D is a push/pull boot connector similar disclosed in U.S. Pat. Application 2019/0243072A1 to Takano, the subject matter of which is fully disclosed in the present invention.

Figure 4A:
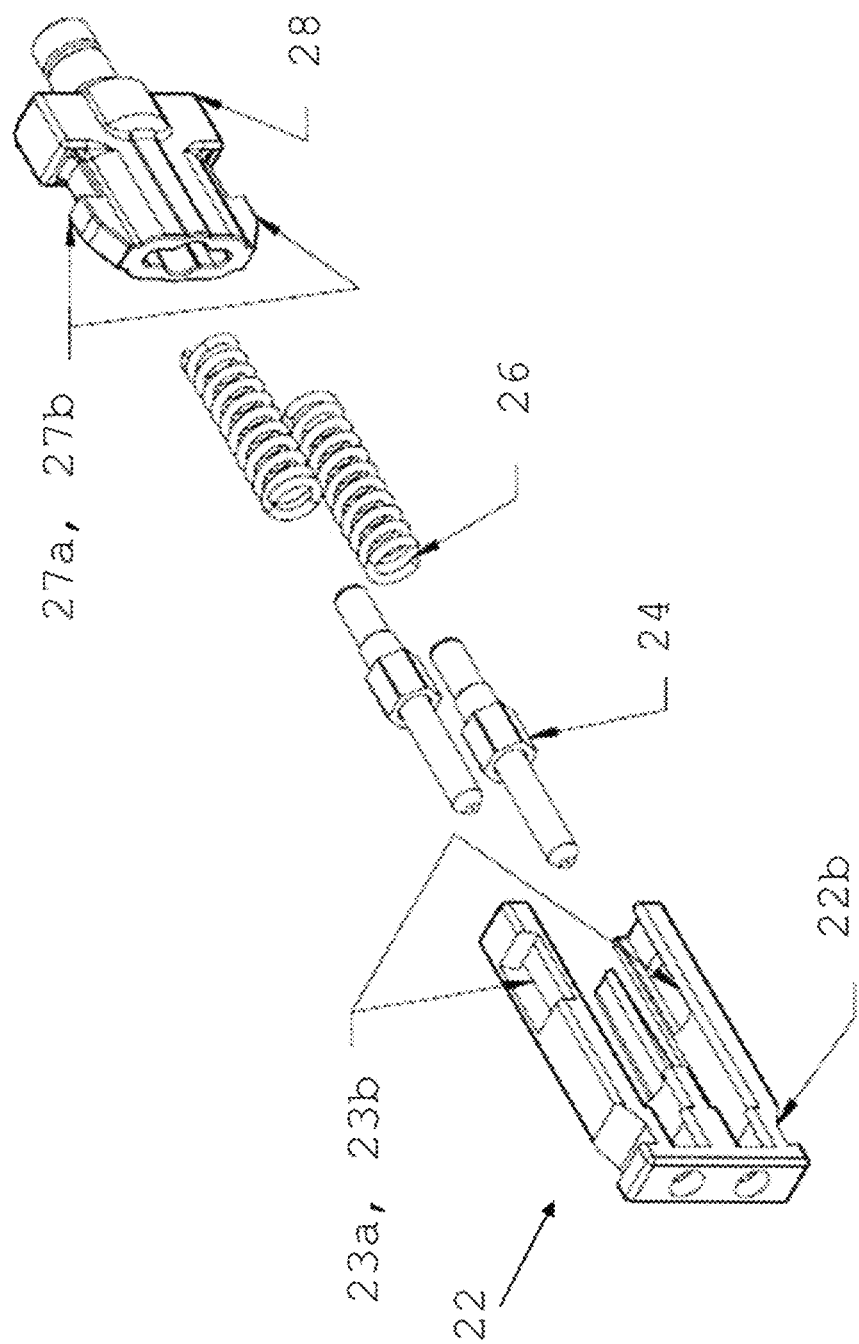
FIG. 4A is a cross section view along section line C-C of an assembled inner front body with a ferrule assembly.

FIG. 4A depicts an exploded view of inner housing (22), flanged ferrules (24), ferrule springs (26) and back body and backpost spring pusher (28), which is the back post to receive the crimp ring to secure the fiber optic cable at a first end or distal end, and a spring push to secure ferrules with bias springs within inner body after assembly at a second end or proximal end. FIG. 4B.1 is a front view of the assembled inner assembly along section line C-C. FIG. 4B.2 is a cross section view along section line C-C of FIG. 481 FIG. 4C depicts ferrule springs (26a, 26b) compressed under force created by securing backpost spring pusher within inner front body (22) via opposing backpost-spring pusher latches (27a, 27b) within openings at a distal end of inner front body.

Figure 5A:
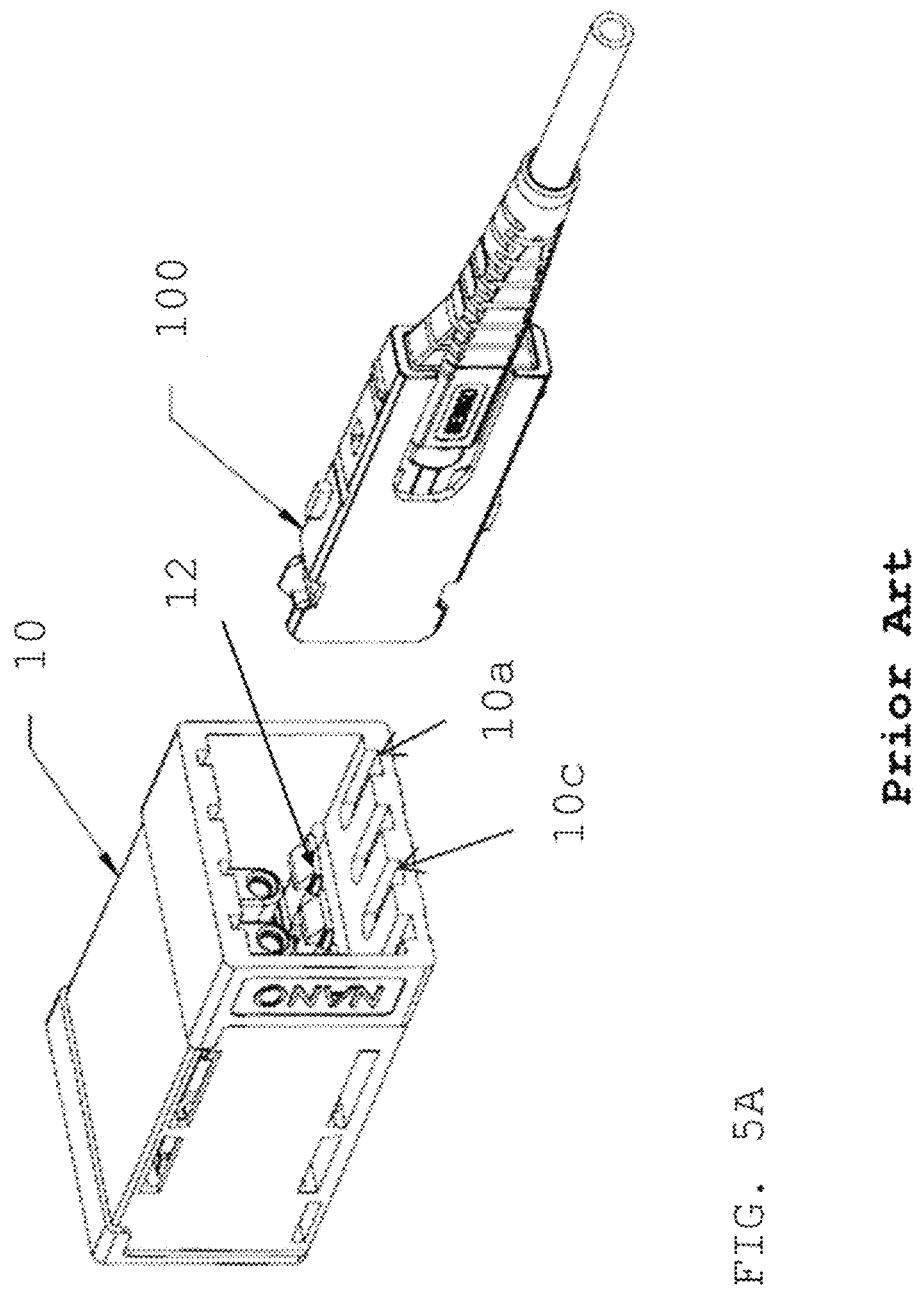
FIG. 5A is an exploded view prior to inserting the small form factor connector into the adapter port with latch hooks.
Figure 5B:
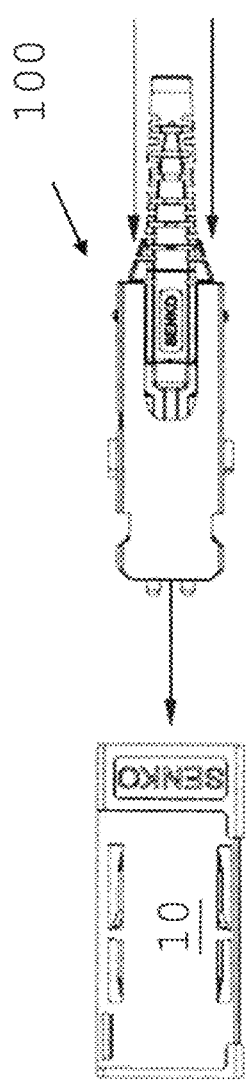
FIG. 5B is a side view of inserting the small form factor connector into the adapter port using the push/pull boot.
Figure 5C:
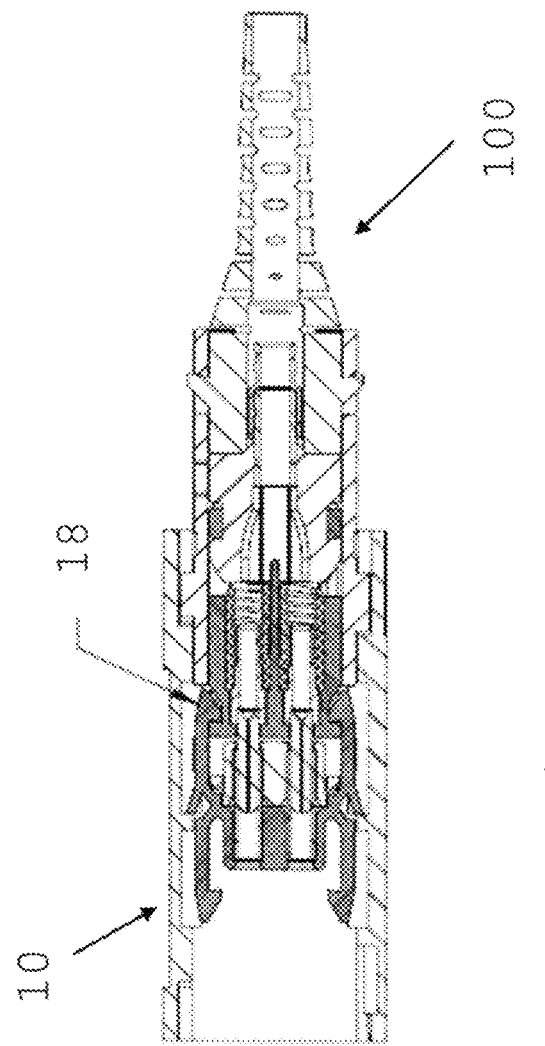
FIG. 5C is a cross-section view of the small form factor connector secured or latched within the adapter.

FIG. 5A depicts adapter housing (10) with ports (10a-10d) each having snap-in hook assembly secured therein, and prior to insertion of an assembled small form factor connector (100) within an adapter port. FIG. 5B is an exploded view of the adapter (10) with snap-in hook assembly using the push/pull boot to insert the connector (100) into an adapter port. FIG. 5C is the connector inserted into adapter port where the opposing latch hooks (18) are secured with the opposing inner front body recesses secured within the connector housing, thereby latching the connector within the adapter port. FIG. 5D depicts the connector being released from the adapter port when a user pulls distally or rearward on the push/pull boot or strain relief. When the user pulls the push/pull boot in the direction of arrow A or in the distal/rearward direction, the latch hook (12a) is moved out of recess (38), as depicted in the Takano and FIG. 5D.

Figure 6A:
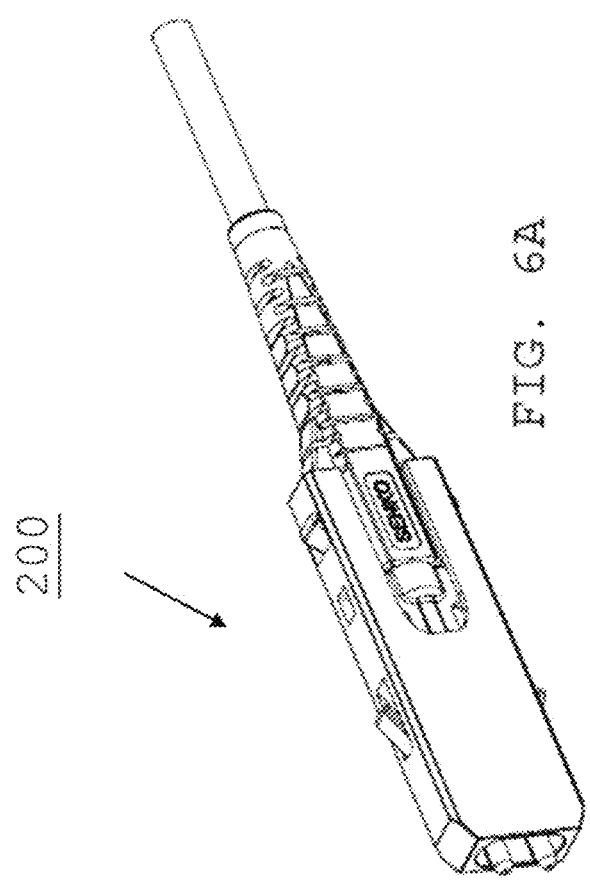
FIG. 6A is a perspective view of a small form factor connector according to an embodiment of the present invention.
Figures 11A, 11B:
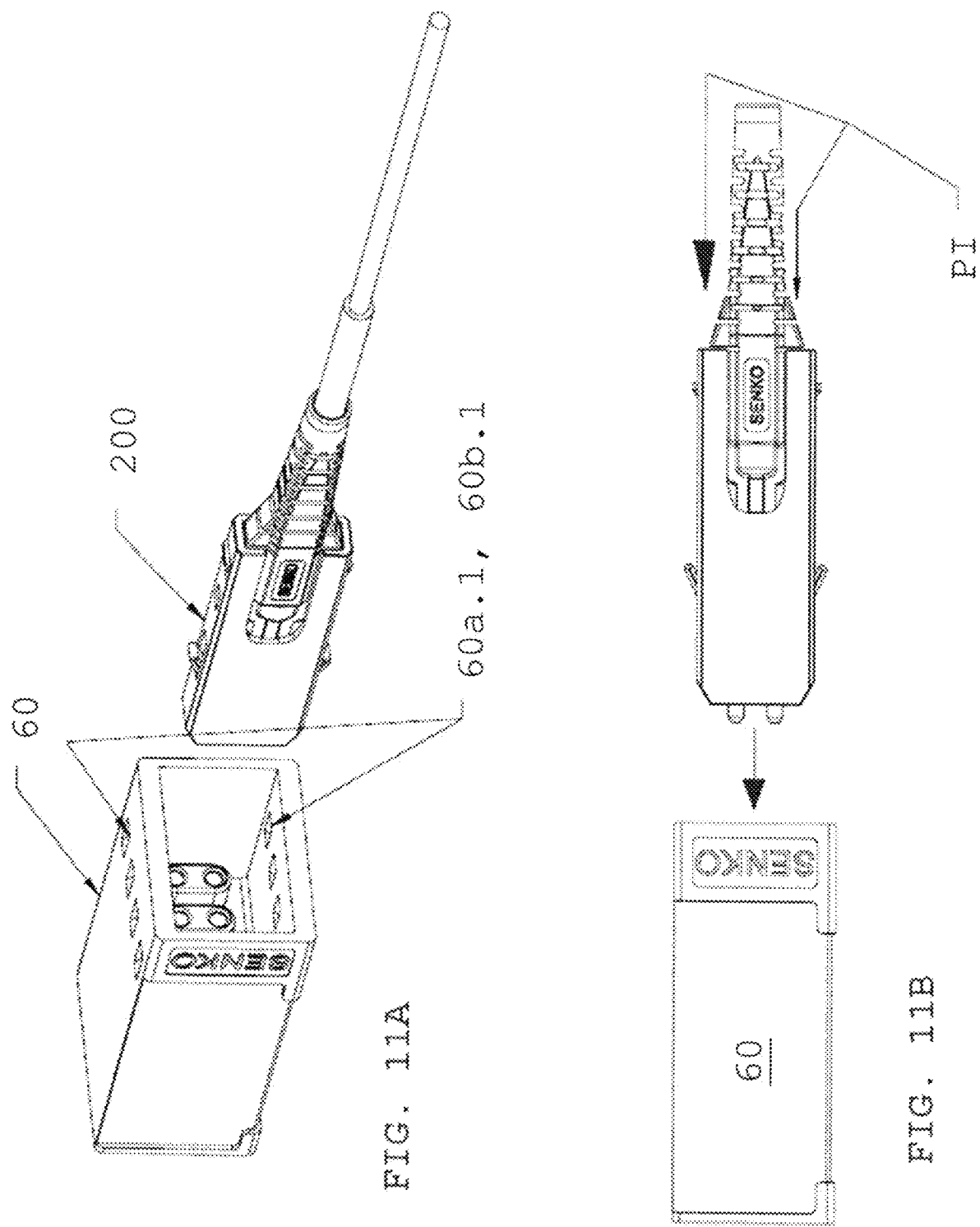
FIG. 11A is an exploded view of a hook-less adapter and small form factor connector of FIG. 10 prior to insertion into an adapter port.
FIG. 11B is an exploded, side view of FIG. 11A.

FIG. 6A depicts assembled small form factor connector (200) according to an embodiment of the present invention. As described in the figures below, the connector outer housing has a pair of opposing openings nearer a proximal end of the outer housing configured to allow pair of resilient latches secured with the inner front body to protrude through openings. The resilient latches protrude through a pair of opposing openings formed in a top wall portion and bottom wall portion of the receptacle housing, as depicted at FIG. 11A. FIG. 6B depicts an exploded view of the small form factor connector (200) depicted in FIG. 8A, further comprises an outer housing (36), an inner front body (38.1) with opposing recesses formed on a top portion (23a) and a bottom portion (23b) of the inner front body (refer to FIG. 8A), the latch holes (38a, 38a) are configured to accept, a resilient latch (42) within the recess. The resilient latch (42) is formed from a metal or a plastic which is characterized by being flexible with breaking when bent from an angle less than ninety (90) degrees about zero (0) degrees relative to a normal formed with the longitudinal bore (L-L') (refer to FIG. 6B) of the outer housing. The inner front body (38.1) accepts a pair of opposing LC-type optical ferrules (44) biased by a corresponding spring (46) at a distal end of the flanged LC-type optical ferrules. Backpost-spring pusher (48) applies a pre-determined load to ensure the springs bias the LC-type optical ferrules forward. The backpost-spring pusher (48) has a pair of opposing latch hooks (37a, 37b) (refer to FIG. 8A) that are accepted into a pair of opposing latch holes (38a, 38b) formed at a distal end of the inner front body (refer to refer to FIG. 8A). The backpost-spring pusher (48) forms an inner front body assembly or inner housing assembly. Referring to FIG. 6B a crimp ring (51) with a heat shrink tubing is crimped onto a post formed at a distal end of the backpost-spring pusher (48). A push/pull boot, is secured to a distal end of the connector outer housing. As depicted in FIG. 7B, a pair of opposing boot latches (32.1, 32.2) are received in a corresponding latch holes (36a, 36b) at the distal end of the connector outer housing (36). Once the push/pull boot is secured to the outer housing (36), with the inner front body assembly, the small form factor connector (200) is assembled according to the present invention with the resilient latch protruding from the proximal opening formed in the outer housing, as depicted in FIG. 9D.

Figure 7C:
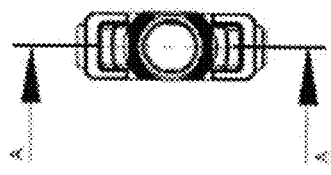
FIG. 7C is a front view of FIG. 7A assembled with section line A-A.
Figure 7D:
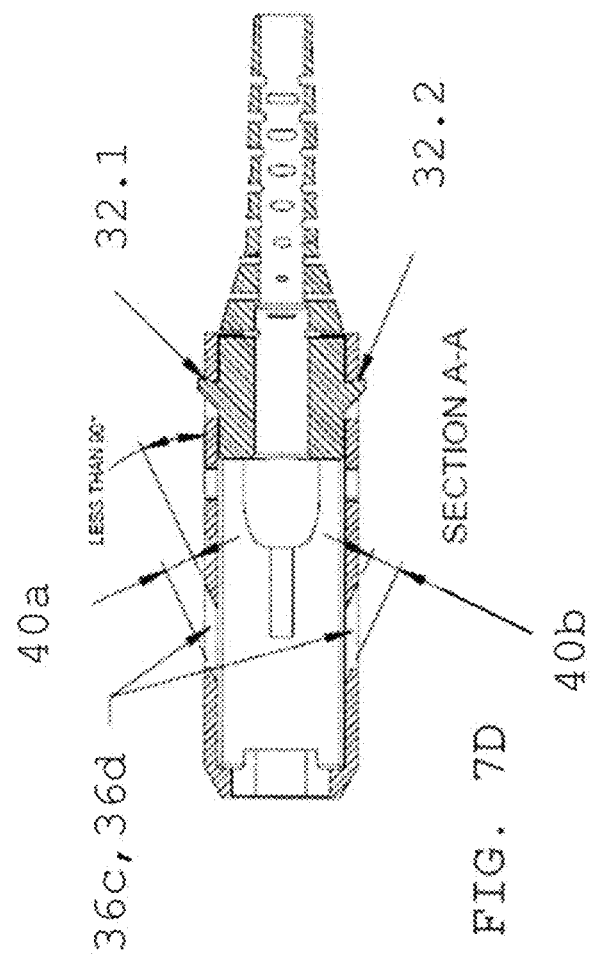
FIG. 7D is a cross-section view along section line A-A of FIG. 7C.

FIG. 7A depicts an exploded view of connector outer housing (36) positioned to accept push/pull boot (32) at a distal end of the outer housing (36). FIG. 7B depicts opposing boot latches (32.1, 32.2) on the push/pull boot prior to being secured to housing via latch holes (36a, 36b), at a distal end of the outer housing (36), configured to accept and secure the boot latches (32.1, 32.2). FIG. 7C is a cross-section of connector assembly (200) along section line A-A. FIG. 7D depicts angled openings (36c, 33d) for the resilient latches (42) secured to the inner front body. Angled opening (36c, 36d) allows for a full travel of the spring latch (42) without binding or jamming within the connector outer housing (36), and further allows for a reduced profile or extension, of the resilient latch (42) beyond the outer housing itself. The angled surface is less than ninety (90) degrees (40a, 40b) to a normal formed with the longitudinal bore of the connector outer housing.

FIG. 8A depicts an exploded view of inner front body (38.1), flanged ferrules (44) holding a LC-type optical ferrule, ferrule bias springs (46) and backpost-spring pusher (48) with opposing latch hooks (37a, 37b) to secure and compress springs when backpost-spring pusher (48) is secured within the latch holes (38a, 38b) at a distal end of inner front body housing. FIG. 8B is a front view along section line B-B of the inner front body assembled (50). FIG. 8C is a side view of the inner front body assembly with LC-type optical ferrules protruding from within the inner front body, FIG. 8l) depicts assembled FIG. 8A. The backpost-spring pusher latch hooks (37a, 37b) secured within latch holes (38a, 38b) at a distal end of inner front body thereby compressing ferrule springs (26a, 26b) and thus ferrules as shown. The backpost-spring pusher compresses the ferrule bias springs to a desired pre-load force necessary to maintain the LC-type optical ferrules in a biased or forward position.

FIG. 9A depicts an exploded view of small form factor connector further illustrating the assembly of the resilient latches (42a, 42b) with the top and bottom portions of the inner front body having a recess therein (39a, 39b). The connector is assembled in the direction of arrow A, after the resilient latches are installed with inner front body as depicted in FIG. 9B. FIG. 9B is a zoomed view of spring resilient latches (42a, 42b) prior to securing to inner front body. FIG. 9C depicts assembling the small form factor connector in the direction of arrow A1 and arrow A2, after resilient latches secured to inner front body. FIG. 9D depicts the push/pull boot or sometimes called a strain relief for the incoming fiber optic cable is attached and secured to distal end of connector outer housing with resilient latches (42a, 42b) protruding through outer housing.

FIG. 10A depicts a side view of small form factor connector according to the present invention, with the resilient latches (42a, 42b) protruding through the connector outer housing. FIG. 10B is a top view of the connector of FIG. 10A with resilient latch (42a). FIG. 10C is a cross-section view alone section line C-C of FIG. 10B. FIG. 10C depicts push-pull boot latched to connector outer housing at a distal end, with resilient latches (42a, 42b) protruding through the outer housing at a proximal end. FIG. 10D depicts a view along section line C-C of FIG. 10B, and shows pulling, back the push/pull boot in direction of the arrow while connector outer housing depresses the resilient latches (42a, 42b) into a corresponding recess (39a, 39b) formed in the inner housing or inner front body.

FIG. 11A depicts inserting the connector (200) of FIG. 10 into port of a receptacle (60). The receptacle port (60) does not contain snap-in hooks. The receptacle port (60) is configured to accept and secure resilient latches, for example, by an opening through a top wall portion (60a.1) and a bottom wall portion (60b.1) of the receptacle outer housing. FIG. 11B depicts inserting connector (200) of FIG. 10 via connector push/pull boot into a receptacle port by pushing on the push/pull boot in a forward or proximal direction PI. FIG. 11C depicts an inner edge (52) of receptacle outer housing depressing resilient latch into recess of inner front body (refer to FIG. 10B) upon insertion into the receptacle port Openings (60a, 60b) at distal end of the housing (60) are sized in width to correspond to the width of openings (38a, 38b) in the inner front body (38.1) to limit the horizontal travel of the push/pull boot and thus the travel of outer housing (60) over the inner front body assembly (50) with backpost-spring pusher (48). The limited travel ensure the resilient latches are within the recess (39a, 39b) without binding the resilient latches in those recesses. Binding the recesses can result in damaging the resilient latch spring constant or force.

Figure 12:
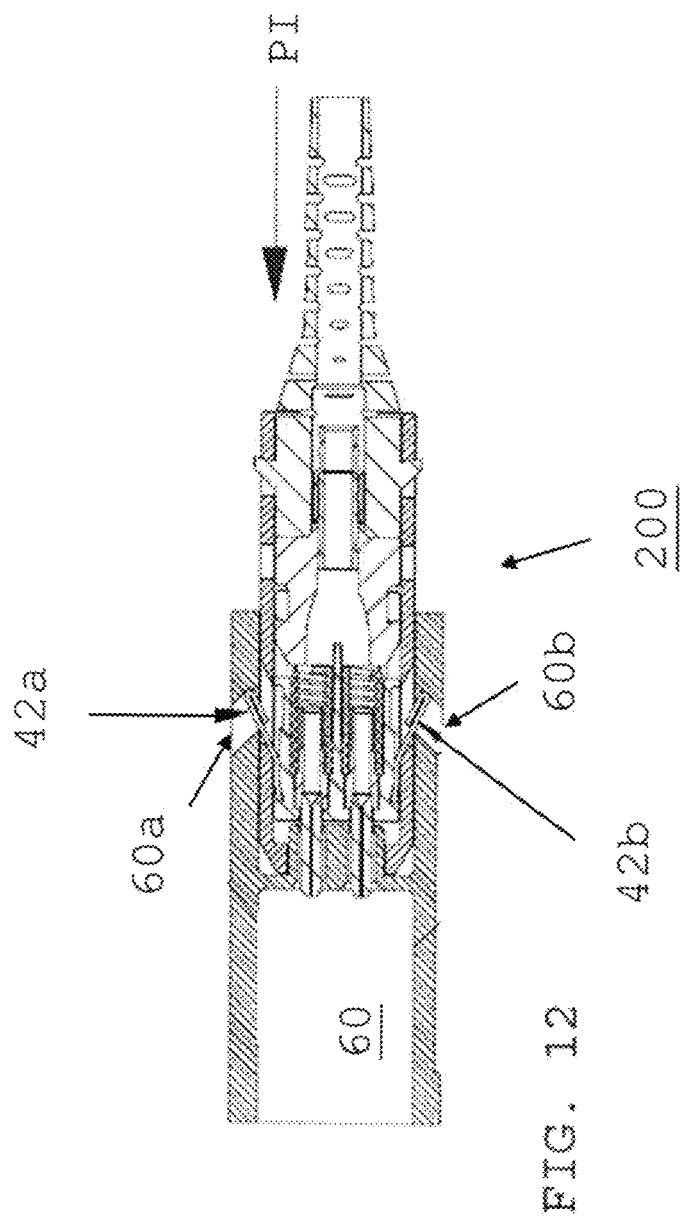
FIG. 12 is a cross section of view the connector of FIG. 10A fully inserted (PI) via the push/pull hoot into a hook-less adapter port.
Figure 13:
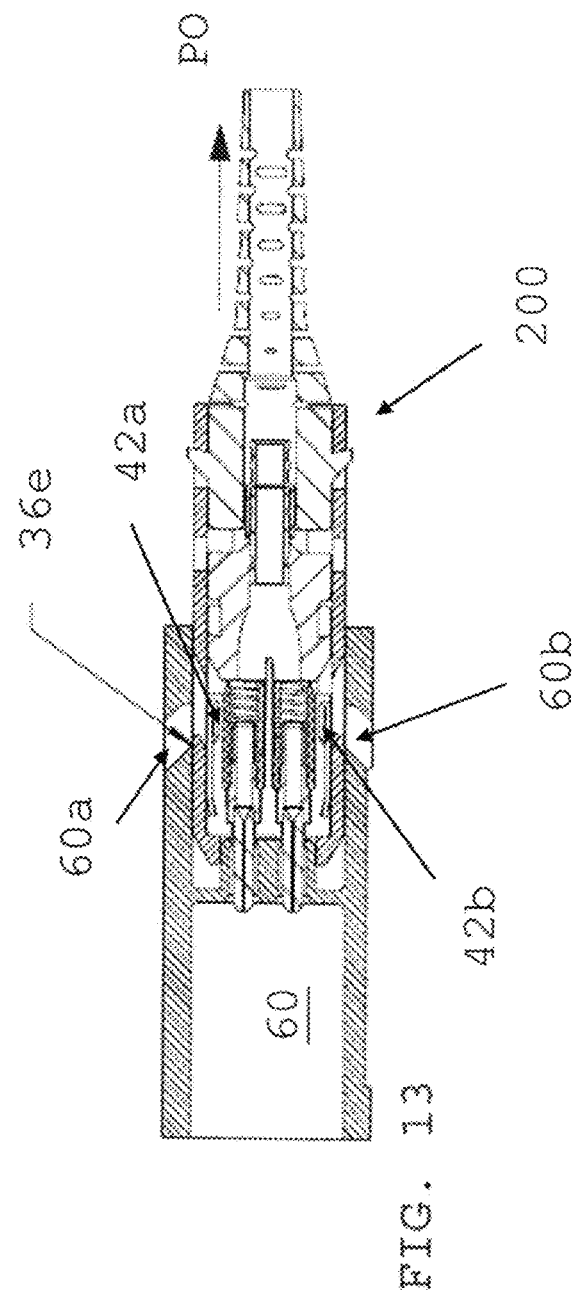
FIG. 13 is a cross section view of the connector of FIG. 10A being released (PO) using the push/pull boot from a hook-less adapter port, and Corresponding reference numbers indicate corresponding parts throughout the drawings.

FIG. 12 depicts resilient latch (42a, 42b) entering a port or an opening in receptacle housing or receptacle (60). As the small form factor connector (200) is fully inserted into the receptacle port (PI), resilient latch (42a, 42b) expand into corresponding openings formed in the top wall portion (60a.1) or bottom wall portion (60b. 1) of the receptacle housing. So when the small form factor connector (200) is frilly seated in the receptacle (60), the resilient latches protrude through the opening's in the receptacle walls. The opening in the receptacle wall is angled more than ninety (90) degrees from a normal to the longitudinal bore of the small form factor connector (60a, 60b). The angle at ninety (90) degrees or greater guides the resilient latch through the opening of the receptacle wall without binding or jamming. FIG. 13 depicts releasing the small form factor connector (200) from the receptacle port by pulling (PO) the push/pull boot release in a distal direction. As the small form factor connector is pulled distally, the resilient latch (42a 42b) travels down the angled inner wall of openings (60a, 60b) formed in the receptacle housing (60) configured to receive the resilient latch, as depicted in FIG. 12, and when the outer housing is pulled distally by the push/pull boot, the outer housing wall (36e) traps or secures the resilient latch in the recesses (39a, 39b) formed in the inner front body as shown in FIG. 13, as the outer housing (36) slides over the resilient latch (42a, 42b) thereby pushing the resilient latch through the openings (60a, 60b) and into the recesses (39a, 39b). Still referring to FIG. 13, the size or width of the opening (60a, 60b) at the distal of the connector outer housing (refer to FIG. 11C) or the latch hole width or angled opening (36c, 36d) (FIG. 7B) limits the travel of the connector outer housing so the outer housing depresses the resilient latch within the recess of the front body.

Various of the above-disclosed and other features and functions, or alternatives thereof, may be combined into man other different systems or applications. Various presently unforeseen or unanticipated alternatives, modifications, variations or improvements therein may be subsequently made by those skilled in the art, each of which is also intended to be encompassed by the disclosed embodiments.

The invention claimed is:
1. A small form factor connector for holding two or more LC-type optical ferrules, comprising:
  an outer housing having a longitudinal bore;
  at least one inner front body removably received in the outer housing longitudinal bore,
  the inner front body supporting two LC-type optical ferrules,
  top and bottom resilient latches;
  the inner front body further comprising top and bottom portions, the top and bottom portions are configured to accept the top and bottom resilient latches;

the outer housing configured such that the top and bottom resilient latches protrude from the top and bottom portions of the inner front body out of the outer housing;

the small form factor connector configured to be plugged into a receptacle such that a portion of the outer housing is received in the receptacle and the top and bottom resilient latches protrude out of the outer housing latch with the receptacle.

2. The small form factor connector for holding two or more LC-type optical ferrules according to claim 1, wherein the top portion and the bottom portions each further comprise a recess to accept a portion of the top and bottom resilient latches.

3. The small form factor connector for holding two or more LC-type optical ferrules according to claim 2, wherein the top and bottom resilient latches protrude through openings formed proximally in the outer housing.

4. The small form factor connector for holding two or more LC-type optical ferrules according to claim 3, wherein the openings in the outer housing are angled.

5. The small form factor connector for holding two or more LC-type optical ferrules according to claim 3, wherein connector housing has a longitudinal axis and wherein the openings in the outer housing each have at least one of a front end and a rear end that slopes at a non-perpendicular angle with respect to the longitudinal axis.

6. The small form factor connector for holding two or more LC-type optical ferrules according to claim 1, wherein the inner front body further comprises partially open sidewalls between the top and bottom portions.

7. The small form factor connector for holding two or more LC-type optical ferrules according to claim 1, wherein a receptacle port does not contain a snap-in hook assembly to secure the small form factor connector within the receptacle port.

8. The small firm factor connector for holding two or more LC-type optical ferrules according to claim 1, where the resilient latch is formed from a metal or a plastic.

9. The small form factor connector for holding two or more LC-type optical ferrules according to claim 1, further comprising a backpost-spring pusher configured to secure to a distal end of the inner front body and ferrule springs resiliently compressed by the backpost-spring pusher being secured to the inner front body.

10. The small form factor connector for holding two or more LC-type optical ferrules according to claim 1, further comprising a push/pull boot secured to a distal end of the outer housing thereby securing the inner front body within the outer housing, and further wherein the push/pull boot is configured to release the small form factor connector from the receptacle when the push/pull boot is pulled rearward.

11. The small form factor connector for holding two or more LC-type optical ferrules according to claim 10, wherein pulling the push/pull boot rearward slides outer housing over the top and bottom resilient latches, thereby depressing the top and bottom resilient latches to unlatch the small form factor connector from the receptacle.

12. The small form factor connector for holding two or more LC-type optical ferrules according to claim 11, wherein the push/pull boot is usable to secure the small form factor connector in the receptacle when the push/pull boot is pushed in a forward direction such that a leading edge of the receptacle depresses the top and bottom resilient latches as the small form factor connector is inserted into the receptacle.

13. The small form factor connector for holding two or more LC-type optical ferrules according to claim 12, wherein when the small form factor connector is fully pushed into the receptacle, the top and bottom resilient latches are configured to resiliently rebound and protrude into respective latch recesses of the receptacle.

14. A small form factor connector for holding two or more LC-type optical ferrules, comprising:
an outer housing having a longitudinal bore;
at least one inner front body removably received in the outer housing longitudinal bore,
the inner front body supporting two LC-type optical ferrules,
the inner front body further comprising top and bottom portions, the top and bottom portions are configured to accept a resilient latch;
wherein the top portion and the bottom portion each further comprise a recess to accept a portion of the resilient latch;
wherein the resilient latch protrudes through an opening formed proximally in the outer housing; and
wherein the proximal opening in the outer housing is angled.

15. The small form factor connector for holding two or more LC-type optical ferrules according to claim 14, wherein the angle of the proximal opening is less than ninety (90) degrees relative to a normal formed with the longitudinal bore.

16. A small form factor connector for holding two or more LC-type optical ferrules, comprising:
an outer housing having a longitudinal bore;
at least one inner front body removably received in the outer housing longitudinal bore,
the inner front body supporting two LC-type optical ferrules,
the inner front body further comprising top and bottom portions, the top and bottom portions are configured to accept a resilient latch;
wherein the inner front body top and bottom portions further comprises partially open sidewalls;
wherein a backpost-spring pusher is configured to secure to a distal end of the inner front body, and further wherein the inner front body is configured to accept the two or more LC-type optical ferrules each biased by a ferrule spring when the backpost-spring pusher is secured to the inner front body by a pair of opposing latch hooks within a pair of openings formed at a distal end of the inner front body thereby forming, an inner front body assembly.

17. The small form factor connector for holding two or more LC-type optical ferrules according to claim 16, wherein the inner front body assembly is secured within the outer housing.

18. The small form factor connector for holding two or more LC-type optical ferrules according to claim 17, wherein a push/pull boot is secured to a distal end of the outer housing thereby securing the inner front body within the outer housing, and further wherein the push/pull boot is configured to release the small form factor connector from the receptacle port when the push/pull boot is pulled rearward.

19. The small form factor connector for holding two or more LC-type optical ferrules according to claim 18, wherein pulling the push/pull boot rearward, the outer housing slides over resilient latch retracting the resilient latch from the opening in the receptacle outer housing thereby allowing the small form factor connector to be removed from the receptacle port.

20. The small form factor connector for holding two or more LC-type optical ferrules according to claim 19, wherein the push/pull boot is used to secure the small form factor connector in the receptacle port when the push/pull boot is pushed in a forward direction thereby allowing the resilient latch to return to its original position and protrude through the receptacle outer housing opening once the small form factor connector is fully inserted into the receptacle port.

21. The small form factor connector for holding two or more LC-type optical ferrules according to claim 20, wherein a leading edge of the receptacle outer housing depresses the resilient latch as the small form factor connector is inserted into the receptacle port.

* * * * *